United States Patent
Zhang et al.

(10) Patent No.: US 12,122,893 B2
(45) Date of Patent: Oct. 22, 2024

(54) TIRE TREAD

(71) Applicant: Beyond Lotus LLC, Wilmington, DE (US)

(72) Inventors: Ping Zhang, Westford, MA (US); Prachi A. Dhavale, Woburn, MA (US); Ani T. Nikova, Winchester, MA (US); Jincheng Xiong, Boxborough, MA (US)

(73) Assignee: Beyond Lotus LLC, Wilmington, DE (US)

( * ) Notice: Subject to any disclaimer, the term of this patent is extended or adjusted under 35 U.S.C. 154(b) by 361 days.

(21) Appl. No.: 17/616,267

(22) PCT Filed: Jun. 4, 2020

(86) PCT No.: PCT/US2020/036179
§ 371 (c)(1),
(2) Date: Dec. 3, 2021

(87) PCT Pub. No.: WO2020/247672
PCT Pub. Date: Dec. 10, 2020

(65) Prior Publication Data
US 2022/0251333 A1    Aug. 11, 2022

Related U.S. Application Data

(60) Provisional application No. 62/857,779, filed on Jun. 5, 2019.

(51) Int. Cl.
| | |
|---|---|
| C08K 3/04 | (2006.01) |
| B29B 7/48 | (2006.01) |
| B29B 7/72 | (2006.01) |
| B29B 7/74 | (2006.01) |
| B29B 7/82 | (2006.01) |
| B29B 7/90 | (2006.01) |
| B60C 1/00 | (2006.01) |
| B60C 11/00 | (2006.01) |
| C08K 3/36 | (2006.01) |

(52) U.S. Cl.
CPC ............... *C08K 3/36* (2013.01); *B29B 7/48* (2013.01); *B29B 7/726* (2013.01); *B29B 7/7495* (2013.01); *B29B 7/823* (2013.01); *B29B 7/826* (2013.01); *B29B 7/90* (2013.01); *B60C 1/0016* (2013.01); *B60C 11/00* (2013.01); *C08K 3/04* (2013.01); *B60C 2011/0025* (2013.01); *C08K 2201/006* (2013.01)

(58) Field of Classification Search
CPC .... C08K 3/04; C08K 3/36; B60C 1/00; B60C 11/00
USPC ........................................................ 524/492
See application file for complete search history.

(56) References Cited

U.S. PATENT DOCUMENTS

| | | |
|---|---|---|
| 2,820,836 A | 1/1958 | Smith |
| 3,294,720 A | 12/1966 | Beber et al. |
| 4,073,840 A | 2/1978 | Saidla |
| 5,108,188 A | 4/1992 | Peter et al. |
| 5,183,640 A | 2/1993 | Peter et al. |
| 5,251,977 A | 10/1993 | Peter et al. |
| 5,368,383 A | 11/1994 | Peter et al. |
| 5,599,868 A | 2/1997 | Bohm et al. |
| 5,633,296 A | 5/1997 | Peter |
| 5,990,211 A | 11/1999 | Yano |
| 6,068,922 A | 5/2000 | Vercesi et al. |
| 6,075,084 A | 6/2000 | Mabry et al. |
| 6,136,913 A | 10/2000 | Nahmias et al. |
| 6,357,016 B1 | 3/2002 | Rodgers et al. |
| 6,372,822 B1 | 4/2002 | Chung et al. |
| 6,646,028 B2 | 11/2003 | Lopez-Serrano Ramos et al. |
| 6,828,361 B2 | 12/2004 | Peter et al. |
| 6,902,312 B2 | 6/2005 | Peter |
| 6,929,783 B2 | 8/2005 | Chung et al. |
| 7,683,115 B2 | 3/2010 | Hsu et al. |
| 8,586,651 B2 | 11/2013 | Wang et al. |
| 9,115,258 B2 | 8/2015 | De Gaudemaris et al. |
| 9,701,161 B2 | 7/2017 | Bondu et al. |
| 9,713,942 B2 | 7/2017 | Bondu et al. |
| 9,714,325 B2 | 7/2017 | Miyasaka |
| 9,758,627 B2 | 9/2017 | Wang et al. |
| 9,834,658 B2 | 12/2017 | Yanagi |
| 10,017,612 B2 | 7/2018 | Tanaka et al. |
| 10,023,723 B2 | 7/2018 | Jiang et al. |
| 10,308,073 B2 | 6/2019 | Gervais et al. |

(Continued)

FOREIGN PATENT DOCUMENTS

| | | |
|---|---|---|
| CN | 101214706 A | 7/2008 |
| CN | 101851360 A | 10/2010 |

(Continued)

OTHER PUBLICATIONS

The International Search Report and The Written Opinion of Internationl Application No. PCT/US2020/036179, mailed Sep. 10, 2020.
Kim, Kwang-Jea, et al., "Moisture Effects on Improved Hydrolysis Reaction for TESPT and TESPD-Silica Compounds", Composite Interfaces, 11:7, pp. 471-488 (2004).
Kim, Kwang-Jea, et al., "Moisture Effects on TESPD-Silica/CB/SBR Compounds", Spring Rubber Division, ACS, Meeting (San Franscisco), Apr. 28-30, 2003, revised Jan. 2005, pp. 84-104.

(Continued)

*Primary Examiner* — Deve V Hall

(57) ABSTRACT

A tire tread and a tire are provided, more particularly, a tire having a tread or other elastomeric component within enhanced composite material properties, including, but not limited to, modulus ratio, percent elongation at break, and/or tan delta, wherein the tire, tread or other elastomeric component comprise composites characterized by well dispersed reinforcing filler, which can be indicated by macrodispersion.

12 Claims, No Drawings

(56) References Cited

U.S. PATENT DOCUMENTS

| | | |
|---|---|---|
| 2005/0080179 A1 | 4/2005 | Kim et al. |
| 2005/0209370 A1 | 9/2005 | Zhang et al. |
| 2005/0239946 A1 | 10/2005 | Lin et al. |
| 2005/0277717 A1 | 12/2005 | Joshi et al. |
| 2007/0219320 A1 | 9/2007 | Ichino et al. |
| 2008/0194746 A1 | 8/2008 | Jiang et al. |
| 2010/0197847 A1 | 8/2010 | Abdallah et al. |
| 2011/0021664 A1 | 1/2011 | Wang et al. |
| 2011/0265923 A1 | 11/2011 | Arnold et al. |
| 2012/0172517 A1 | 7/2012 | Zhang et al. |
| 2013/0231417 A1 | 9/2013 | Vasseur et al. |
| 2014/0031487 A1* | 1/2014 | Guy .............. C08F 253/00 525/288 |
| 2015/0299436 A1 | 10/2015 | Shin et al. |
| 2016/0075836 A1* | 3/2016 | Adler .............. C08L 7/00 524/575.5 |
| 2017/0044347 A1 | 2/2017 | Yanagi |
| 2017/0120682 A1 | 5/2017 | Rehab et al. |
| 2018/0282523 A1 | 10/2018 | Sandstrom |
| 2018/0371181 A1 | 12/2018 | Ghosal et al. |
| 2020/0317823 A1 | 10/2020 | Dussillols et al. |

FOREIGN PATENT DOCUMENTS

| | | |
|---|---|---|
| CN | 106674631 A | 5/2017 |
| CN | 107457933 A | 12/2017 |
| DE | 10149163 A1 | 4/2003 |
| DE | 102017212387 A1 | 1/2019 |
| DE | 102017223554 A1 | 6/2019 |
| EP | 1110691 A2 | 6/2001 |
| EP | 1191058 A1 | 3/2002 |
| EP | 1321488 A1 | 6/2003 |
| EP | 1757658 A1 | 2/2007 |
| EP | 1425338 B1 | 8/2011 |
| EP | 2410003 B1 | 4/2014 |
| EP | 3494173 B1 | 6/2021 |
| GB | 770773 | 3/1957 |
| GB | 940632 | 10/1963 |
| GB | 981836 | 1/1965 |
| JP | H11263882 | 9/1999 |
| JP | 4278765 B2 | 6/2009 |
| JP | 2010/174232 A | 8/2010 |
| JP | 2013/018315 A | 1/2013 |
| JP | 2014/227542 | 12/2014 |
| JP | 2014227540 A | 12/2014 |
| JP | 2017008244 A | 1/2017 |
| WO | WO 99/16600 | 4/1999 |
| WO | WO 2011/034587 A2 | 3/2011 |
| WO | WO 2015/067970 A1 | 5/2015 |
| WO | WO 2017/008244 A1 | 1/2017 |
| WO | WO 2017/011570 A1 | 1/2017 |
| WO | WO 2017/093805 A1 | 6/2017 |
| WO | WO 2018/219630 A1 | 12/2018 |
| WO | WO 2018/219631 A1 | 12/2018 |
| WO | WO-2019094551 A1 * | 5/2019 ............ B01F 23/704 |
| WO | WO 2019/133442 A1 | 7/2019 |
| WO | WO 2020/001823 A1 | 1/2020 |

OTHER PUBLICATIONS

Kim, Kwang-Jea, et al., "Temperature Effects of Silane Coupling on Moisture Treated Silica Surface", Journal of Applied Polymer Science, vol. 95, pp. 623-633 (2005).

Wang, M.J., et al., "NR/Carbon Black Masterbatch Produced with Continuous Liquid Phase Mixing," KGK Kautschuk Gummi Kunstoffe 55. Jahrgang, Jr. Jul. 8, 2002, pp. 388-396.

* cited by examiner

TIRE TREAD

FIELD OF THE INVENTION

The invention is a directed to a tire tread and a tire. The tire tread and/or tire preferably has enhanced material properties, such as, but not limited to, modulus ratio, percent elongation at break, and/or tan delta. The tire tread and tire include an elastomeric material and well dispersed reinforcing filler. The tire can be a pneumatic tire, having radial carcass reinforcement and additional layers or zones of elastomeric materials, intended to be fitted to vehicles carrying heavy loads and driving at sustained speeds, such as trucks, tractors, trailers or buses. Alternatively, the tire and the tire tread of the invention can be fitted to vehicles such as light trucks, passenger cars, performance vehicles, motorcycles, off-the-road vehicles, heavy equipment vehicles, aircraft and other vehicles, including vehicles fitted with tracks having rubber treads mounted on the tracks.

BACKGROUND

In heavy duty tires used for trucks and buses, and in other tire types, it is known to form tire treads into multi-layered structures, for example, a cap rubber layer providing the outer surface of the tread and a base rubber layer disposed radially inward of the cap rubber layer, wherein a rubber having an excellent wear resistance is used in a cap rubber layer and a low heat-generating rubber having a low loss tangent is used in a base rubber layer. Selected rubber compounds having enhanced properties have been used in other higher stress areas of the tire, such as in the shoulder area of the tread. See, e.g., U.S. Pat. No. 10,399,386. It is desirable to fabricate tire treads to achieve simultaneously high levels of wear and stress resistance, low heat buildup (low tan delta) and low rolling resistance to achieve improved fuel economy together with improved tire life and durability in original and replacement tire treads.

Many tire and tread designs and formulations have been proposed to balance rubber material properties of mechanical and tensile strength against heat buildup, so as to yield acceptable tire performance and longevity under typical stresses, such as vehicle weight and speed, surface conditions and operating temperatures. See, e.g., U.S. Pat. Nos. 6,247,512, 10,479,037, 10,308,073 and US 2009/0255613. Some propose using different materials in the axial direction for forming the tread. The central, equatorial plane materials may differ from the lateral plane materials, and these materials may differ from materials used in various internal zones of the tread. See, e.g., U.S. Pat. No. 9,713,942. Often, an outer material coming into contact with the ground exhibits better wear performance and an inner material exhibits hysteresis properties enabling less heat generation and lower operating temperatures in the crown region when these materials are superimposed on the trend. Void patterns in the tread may be varied in the axial direction, in many cases with lower void ratios in the central equatorial plane and a higher surface area of grooves or sipes in the outer axial portion of the tread. Additional, inner layers of elastomeric material have been proposed for targeted regions for mechanical strength and heat management, and the thickness of the respective layers of materials has been selected to optimize tire life and performance. To enhance tire performance metrics, some designs and formulations specify elastomeric materials having enhanced levels of filler dispersion that has been achieved by a liquid elastomer masterbatch process as a means to optimize tire performance. See, e.g., U.S. Pat. Nos. 10,308,073B2, 10,017,612, 9,834,658 and 9,713, 942B2.

The present invention preferably provides a tire having both excellent material strength and sufficiently low rolling resistance and low heat build-up to satisfy fuel economy targets.

SUMMARY OF THE INVENTION

A feature of the present invention is to provide a tire tread with one or more beneficial properties.

A further feature of the present invention is to provide a tire tread that provides excellent material strength and/or sufficiently low rolling resistance and/or low heat build-up to satisfy fuel economy targets.

To achieve these and other advantages and in accordance with the purposes of the present invention, as embodied and described herein, the present invention relates a tire tread comprising at least one elastomer and 40-80 phr of at least one filler, the filler comprising at least 40 phr of at least one carbon black, the tire tread having:
  a) Modulus ratio >5.60;
  b) Percent elongation at break >470, and
  c) Tan delta at 60° C. ≥0.10 and <0.25.

The present invention further relates to a tire tread comprising at least one elastomer and 20-80 phr of at least one filler, the filler comprising 40 phr or less of at least one carbon black, the tread having:
  a) Modulus ratio ≥5.43;
  b) Percent elongation at break >400, and
  c) Tan delta at 60° C. ≥0.09 and <0.15.

Also, the present invention relates to a tire tread comprising at least one elastomer and 20-80 phr of at least one filler, the filler comprising at least one carbon black, and the tread characterized by a macrodispersion value V, an area percentage of undispersed carbon black particles larger than 10 μm determined by optical microscopy in transmission mode, according to the equation 0.01<V<0.15.

In addition, the present invention relates to a tire tread comprising at least one elastomer and 20-80 phr of at least one filler, the filler comprising at least one carbon black, and the tread characterized by a macrodispersion value V, an area percentage of undispersed carbon black particles larger than 10 μm determined by optical microscopy in transmission mode, of greater than 0.01, and the tread having at least one of:
  a) Modulus ratio ≥5.43; or
  b) Percent elongation at break >400, or
  c) Tan delta at 60° C. <0.25.

Furthermore, the present invention relates to a tire tread comprising at least one elastomer and 20-80 phr of at least one filler, the filler comprising at least 40 phr of at least one carbon black, the tire tread having:
  a) Modulus ratio >5.60;
  b) Percent elongation at break >400, and
  c) Tan delta at 60° C. >0.09 and <0.15,
  and the tread is characterized by a macrodispersion value V, an area percentage of undispersed carbon black particles larger than 10 μm as determined by optical microscopy in transmission mode, according to the equation 0.01<V<0.15.

The present invention further relates to a tire tread wherein the tire tread can comprise at least one elastomer and 20-80 phr of at least one filler. The filler can comprise at least 40 phr of at least one carbon black. The tire tread can have:

a) Modulus ratio >5.60;
b) Percent elongation at break >480, and optionally
c) Tan delta at 60° C. <0.25.

The tire tread is further characterized by the macrodispersion value V, an area percentage of undispersed carbon black particles larger than 10 μm as determined by optical microscopy in transmission mode of greater than 0.01.

The present invention also relates to tires that include a tire tread of the present invention.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

It is to be understood that both the foregoing general description and the following detailed description are exemplary and explanatory only and intended to provide a further explanation of the present invention, as claimed.

DETAILED DESCRIPTION OF THE INVENTION

Tires and tire treads of the invention comprise selected composites compounded into rubber formulations selected for desired tire sizes, grades, and purposes. In one aspect of the invention, the tire treads of the invention can be characterized by an enhanced combination of material strength, low heat build-up and low rolling resistance, as indicated by increased modulus ratio and elongation at break with an associated, but unexpected, decrease in hysteresis (tan delta). Tire treads of the invention can be used in tires for heavy load vehicles, such as off-the-road tires, agricultural vehicles and truck and bus tires, in tires for lighter vehicles, such as light trucks, passenger cars, performance vehicles and motorcycles, in aircraft tires and in other tires, and in vehicles fitted with tracks having rubber treads mounted on the tracks.

Various tire treads form a part of the present invention. The tire treads can be characterized by the phr amount of the filler, the phr amount of carbon black that is part of the filler, a modulus ratio value or range, a percent elongation at break value or range, a tan delta value or range, and/or a macrodispersion value or range and any combinations of any two or more of these parameters, as further described herein.

For instance, a tire tread of the invention can comprise at least one elastomer and 40-80 phr of at least one filler (Tire Tread A). The filler can comprise at least 40 phr of at least one carbon black. The tire tread can have:
a) Modulus ratio >5.60;
b) Percent elongation at break >470, and
c) Tan delta at 60° C. >0.10 and <0.25.

With respect to the tire treads in general and Tire Tread A, the modulus ratio, the percent elongation at break, and the tan delta values can be based on a test where the tire tread being tested has carbon black present at 50 phr.

With respect to the tire treads in general and Tire Tread A, the modulus ratio can be, for instance, 5.61 or higher, 5.62 or higher, 5.63, or higher, 5.64 or higher, 5.65 or higher, 5.65 or higher, 5.66 or higher, 5.67 or higher, 5.68 or higher, 5.69 or higher, 5.7 or higher, 5.71 or higher, 5.75 or higher, such as from 5.61 to 6.3, or 5.62 to 6.3, or 5.63 to 6.3, or 5.67 to 6.3, or from 5.7 to 6.3 or other values within one of these ranges.

With respect to the tire treads in general and Tire Tread A, the percent elongation at break can be 471 or higher, 472 or higher, 473 or higher, 474 or higher, 475 or higher, 480 or higher, 485 or higher, 490 or higher, 495 or higher, 500 or higher, such as from 475 to 550, or from 480 to 525, or from 480 to 500 or other values within one of these ranges.

With respect to the tire treads in general and Tire Tread A, the tan delta can be from 0.10 to 0.249, or from 0.10 to 0.245, or from 0.10 to 0.24, or from 0.10 to 0.23, or from 0.10 to 0.22, or from 0.11 to 0.245, or from 0.11 to 0.24, or from 0.12 to 0.2, or other values within one of these ranges.

With respect to the tire treads in general and Tire Tread A, the elastomer can comprise natural rubber, functionalized natural rubber, styrene-butadiene rubber, functionalized styrene-butadiene rubber, polybutadiene rubber, functionalized polybutadiene rubber, or any blends thereof. Or, the elastomer can be any of the elastomers or blends thereof as described herein and in further detail below.

The present invention further relates to a tire tread (Tire Tread B), wherein the tire tread can comprise at least one elastomer and 20-80 phr of at least one filler. The filler can comprise 40 phr or less of at least one carbon black. The tire tread can have:
a) Modulus ratio >5.43;
b) Percent elongation at break >400, and
c) Tan delta at 60° C. >0.09 and <0.15.

With respect to the tire treads in general and Tire Tread B, the modulus ratio, the percent elongation at break, and the tan delta values can be based on the tire tread being tested with a carbon black amount of 40 phr.

With respect to the tire treads in general and Tire Tread B, the modulus ratio can be 5.43 or higher, 5.5 or higher, 5.6 or higher, 5.7 or higher, 5.8 or higher, 5.9 or higher, 6.0 or higher, such as from 5.43 to 6.25, or from 5.43 to 6.2, or any values within one of these ranges.

With respect to the tire treads in general and Tire Tread B, the percent elongation at break can be 401 or higher, 402 or higher, 403 or higher, 404 or higher, 405 or higher, 410 or higher, 415 or higher, 420 or higher, 425 or higher, 430 or higher, 435 or higher, 440 or higher, 445 or higher, 450 or higher, 455 or higher 460 or higher, 465 or higher, 470 or higher, 475 or higher, 480 or higher, 485 or higher, 490 or higher, 495 or higher, 500 or higher, such as from 405 to 550, or from 425 to 525, or from 425 to 500, or any values within one of these ranges.

With respect to the tire treads in general and Tire Tread B, the tan delta can be from 0.091 to 0.149, or from 0.091 to 0.145, or from 0.091 to 0.14, or from 0.092 to 0.14, or from 0.095 to 0.13, or from 0.095 to 0.14, or from 0.10 to 0.12, or from 0.10 to 0.11, or any values within one of these ranges.

With respect to the tire treads in general and Tire Tread A and/or B, the tire tread can be further characterized by a macrodispersion value V. This value V is the area percentage of undispersed carbon black particles that are larger than 10 μm, as determined by optical microscopy in transmission mode. The macrodispersion value V can be according to the equation: $0.01<V<0.15$. The macrodispersion value V can be $0.011<V<0.15$, or $0.012<V<0.15$, or $0.013<V<0.15$, or $0.014<V<0.15$, or $0.015<V<0.15$, or $0.02<V<0.15$, or $0.05<V<0.15$, or $0.07<V<0.15$, or $0.08<V<0.15$, or $0.09<V<0.12$, or any values within one of these ranges.

The present invention further relates to a tire tread (Tire Tread C), wherein the tire tread can comprise at least one elastomer and 20-80 phr of at least one filler. The filler can comprise at least one carbon black. The tire tread being can be characterized by the above-described macrodispersion value V, defined herein as an area percentage of undispersed carbon black particles larger than 10 μm as determined by optical microscopy in transmission mode. The macrodispersion value V can be according to the equation: 0.01<V<0.15. The macrodispersion value V can be 0.011<V<0.15, or 0.012<V<0.15, or 0.013<V<0.15, or 0.014<V<0.15, or 0.015<V<0.15, or 0.016<V<0.15, or 0.017<V<0.15, or 0.018<V<0.15, or 0.019<V<0.15, or 0.02<V<0.15, or 0.05<V<0.15, or 0.07<V<0.15, or 0.08<V<0.15, or 0.09<V<0.14, or 0.01<V<0.13, or 0.01<V<0.12, or 0.01<V<0.11, or 0.01<V<0.1, or any values within one of these ranges.

For any of the macrodispersion values, V, V can be based on a test where the tire tread being tested is with a carbon black amount of 50 phr.

The present invention further relates to a tire tread (Tire Tread D), wherein the tire tread can comprise at least one elastomer and 20-80 phr of at least one filler. The filler can comprise 40 phr or less of at least one carbon black. The tread can be characterized by a macrodispersion value V, as described earlier, (an area percentage of undispersed carbon black particles larger than 10 μm determined by optical microscopy in transmission mode), of greater than 0.01. The tire tread can have one or more (or two of the following or all three) of the following:

a) Modulus ratio ≥5.43; or
b) Percent elongation at break >400, or
c) Tan delta at 60° C. <0.25.

With respect to the tire treads in general and Tire Tread D, the tire tread can have the modulus ratio, the percent elongation at break, and the tan delta values based on a test, where the tire tread being tested is with carbon black in the amount of 40 phr.

With respect to the tire treads in general and Tire Tread D, the macrodispersion value V can be 0.011 or higher, 0.012 or higher, 0.013 or higher, greater than 0.014, or greater than 0.015, or greater than 0.016, or greater than 0.017, or greater than 0.02, or greater than 0.03, or greater than 0.05, or greater than 0.1, or greater than 0.11, or greater than 0.12, or greater than 0.13, or greater than 0.14, or 0.011<V<0.14, or 0.012<V<0.13, or 0.01<V<0.14, or 0.015<V<0.14, or 0.02<V<0.13, or 0.05<V<0.12, or 0.07<V<0.11, or 0.01<V<0.1, or 0.01<V<0.09, or any values within one of these ranges.

With respect to the tire treads in general and Tire Tread D, the modulus ratio can be 5.43 or higher, greater than 5.45, or greater than 5.5, or greater than 5.6, or greater than 5.7, or greater than 5.8 or greater than 5.9 or greater than 5.9, such as from 5.43 to 6.25, or from 5.43 to 6.5, or from 5.43 to 6.5, or from 5.45 to 6.5, or from 5.00 to 6.2, or any values in between any one of these ranges.

With respect to the tire treads in general and Tire Tread D, the percent elongation at break can be 401 or higher, 402 or higher, 403 or higher, 404 or higher, 405 or higher, 410 or higher, 415 or higher, 420 or higher, 425 or higher, 430 or higher, 435 or higher, 440 or higher, 445 or higher, 450 or higher, 455 or higher 460 or higher, 465 or higher, 470 or higher, 475 or higher, 480 or higher, 485 or higher, 490 or higher, 495 or higher, 500 or higher, such as from 405 to 550, or from 425 to 525, or from 425 to 500, or any values within one of these ranges.

With respect to the tire treads in general and Tire Tread D, the tan delta can be 0.249 or lower, or 0.245 or lower, 0.24 or lower, or less than 0.24, or less than 0.23, or less than 0.22, or less than 0.21, or less than 0.2, or less than 0.18, or less than 0.16, or less than 0.14, or less than 0.12 or less than 0.1, such as from 0.09 to 0.249, or from 0.09 to 0.245, or from 0.09 to 0.22, or from 0.10 to 0.2, or any values in between any one of these ranges.

The present invention further relates to a tire tread (Tire Tread E), wherein the tire tread can comprise at least one elastomer and 40-80 phr of at least one filler. The filler can comprise at least 40 phr of at least one carbon black. The tire tread can have a modulus ratio >5.60, a percent elongation at break >470, and a tan delta at 60° C. >0.10 and <0.25.

With respect to the tire treads in general and Tire Tread E, the modulus ratio can be greater than 5.61, or greater than 5.62, or greater than 5.65, or greater than 5.7, or greater than 5.8, or greater than 5.9 or greater than 6 or greater than 6.1 or greater than 6.2, such as from 5.61 to 6.2 or from 5.65 to 6.1 or from 5.7 to 6, or any values in between any one of these ranges.

With respect to the tire treads in general and Tire Tread E, the percent elongation at break can be 471 or higher, 472 or higher, 473 or higher, 474 or higher, 475 or higher, 480 or higher, 485 or higher, 490 or higher, 495 or higher, 500 or higher, such as from 475 to 550, or from 480 to 525, or from 480 to 500 or other values within one of these ranges.

With respect to the tire treads in general and Tire Tread E, the tan delta at 60° C. can be from 0.101 to 0.249, or from 0.105 to 0.245, from 0.11 to 0.24, from 0.12 to 0.24, from 0.13 to 0.24, or from 0.14 to 0.24, or from 0.15 to 0.24, or from 0.16 to 0.23, or from 0.17 to 0.23, or from 0.18 to 0.22, or other values within one of these ranges.

The present invention further relates to a tire tread (Tire Tread F), wherein the tire tread can comprise at least one elastomer and 20-80 phr of at least one filler. The filler can comprise at least 40 phr of at least one carbon black. The tire tread can have:

a) Modulus ratio >5.60;
b) Percent elongation at break >480, and optionally
c) Tan delta at 60° C. <0.25.

For Tire Tread F, the tan delta parameter is optional. Further, in general and with respect to Tire Tread F, the tire tread can be characterized by the macrodispersion value V, as described earlier (an area percentage of undispersed carbon black particles larger than 10 μm as determined by optical microscopy in transmission mode) of greater than 0.01.

With respect to the tire treads in general and Tire Tread F, the tire tread can have the modulus ratio, the percent elongation at break, and the tan delta values based on a test, where the tire tread being tested is with carbon black in the amount of 50 phr.

With respect to the tire treads in general and Tire Tread F, the modulus ratio can be 5.61 or higher, 5.62 or higher, 5.63 or higher, 5.64 or higher, 5.65 or higher, 5.66 or higher, 5.67 or higher, 5.68 or higher, 5.69 or higher, 5.7 or higher, greater than 5.8, or greater than 5.9, or greater than 6.0, or greater than 6.1, or greater than 6.2 or greater than 5.65 or greater than 5.75, such as from 5.61 to 6.25, or from 5.65 to 6.5, or from 5.63 to 6.2, or any values in between any one of these ranges.

With respect to the tire treads in general and Tire Tread F, the percent elongation at break can be 481 or higher, 482 or higher, 483 or higher, 484 or higher, 485 or higher, 490 or higher, 495 or higher, 500 or higher, 505 or higher, 510 or higher, such as from 481 to 550, or from 485 to 525, or from 490 to 500 or other values within one of these ranges.

With respect to the tire treads in general and Tire Tread F, the tan delta can be from less than 0.25, or less than 0.24, or less than 0.23, or less than 0.22, or less than 0.21, or less than 0.2, or less than 0.19, or less than 0.18, or less than 0.17, or less than 0.16, or less than 0.15, such as from 0.09 to 0.249, or from 0.09 to 0.24, or from 0.09 to 0.23, or from 0.09 to 0.22, or greater than 0.09 and less than 0.24, or greater than 0.1 and less than 0.24, or from 0.1 to 0.24, or from 0.1 to 0.23, or from 0.11 to 0.23, from 0.09 to 0.145, or from 0.095 to 0.14, or from 0.095 to 0.13, or from 0.11 to 0.14, or from 0.09 to 0.13, or from 0.09 to 0.12, or from 0.10 to 0.14 or from 0.10 to 0.13, or any values in between any one of these ranges.

With respect to the tire treads in general and Tire Tread F, the macrodispersion value V can be from 0.011 to 0.149, or from 0.012 to 0.145, or from 0.014 to 0.145, from 0.015 to 0.14, from 0.02 to 0.14, from 0.03 to 0.14, from 0.04 to 0.14, from 0.03 to 0.06, from 0.02 to 0.12, from 0.02 to 0.11, from 0.02 to 0.1, from 0.02 to 0.09, from 0.02 to 0.08, from 0.02 to 0.07, from 0.02 to 0.06, from 0.011 to 0.099, greater than 0.01 and less than 0.1, from 0.011 to 0.099, or from 0.012 to 0.095, or from 0.012 to 0.09, or from 0.015 to 0.09, or from 0.02 to 0.09, or from 0.02, to 0.085, or from 0.02 to 0.08, or from 0.025 to 0.07 or any values in between any one of these ranges.

For any of the tire treads, including any one of Tire Treads A through F, the filler can comprise at least one material selected from carbonaceous materials, carbon black, silica, nanocellulose, lignin, clays, nanoclays, metal oxides, metal carbonates, pyrolysis carbon, graphenes, graphene oxides, reduced graphene oxide, carbon nanotubes, single-wall carbon nanotubes, multi-wall carbon nanotubes, or combinations thereof, and coated and treated materials thereof, or any combinations thereof.

For any of the tire treads, including any one of Tire Treads A through F, the filler can comprise carbon black and silica in a carbon black to silica weight ratio greater than 2.7:1, or greater than 2.8:1 or greater than 2.9:1, or greater than 3:1, or greater than 3.5:1, or greater than 4:1, or greater than 4.5:1, or greater than 5:1, such as 2.75:1 to 10:1 or other weight ratios within any one of these ranges.

For any of the tire treads, including any one of Tire Treads A through F, the elastomer can be selected from natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, isobutylene-based elastomers, polychloroprene rubber, nitrile rubber, hydrogenated nitrile rubber, polysulfide rubber, poleyacrylate elastomers, fluoroelastomers, perfluoroelastomers, silicone elastomers, or any blends of two or more thereof.

For any of the tire treads, including any one of Tire Treads A through F, the tire tread can further comprise one or more rubber chemicals selected from antidegradants, processing aids and activators, zinc oxide, fatty acids, zinc salts of fatty acids, wax, accelerators, resins, and/or processing oil. Any one or more of these can be present.

For any of the tire treads, including any one of Tire Treads A through F, the tire tread can have carbon black present as the filler or one of the fillers. The carbon black can have a STSA>140 m$^2$/g, or a STSA>150 m$^2$/g, or a STSA of from 110 m$^2$/g to 220 m$^2$/g, or a STSA of from 120 m$^2$/g to 180 m$^2$/g, or a STSA of from 140 m$^2$/g to 180 m$^2$/g, or a STSA of from 150 m$^2$/g to 160 m$^2$/g. Other details of the filler including carbon black are provided below and can be used for any of the tire tread formulations.

The tire treads of the present invention can be formed utilizing one or more of the following process steps to form an elastomer composite, which then can be compounded into a tire tread formulation and then fabricated into a tire tread. The present invention includes any tire tread and/or tire formed by any one of the processes described herein or any combinations thereof.

Process Steps (1), as follows, can be used to make a tire tread of the present invention:
(a) charging a mixer with materials comprising one or more solid elastomer(s) and one or more wet filler(s), comprising the filler(s) and at least 15% by weight of liquid, on a total wet filler(s) weight basis;
(b) mixing the charged materials to form a mixture at mixer temperatures controlled by at least one temperature-control means, optionally with such control means set to a temperature, Tz, ranging from 30° C. to 150° C., and at a mixer rotor tip speed of at least 0.6 m/s for at least 50% of the duration of mixing, while removing at least a portion of the liquid, optionally at least 50% by weight of the liquid, from the mixture by evaporation; and
(c) discharging from the mixer the elastomer composite comprising the filler(s) dispersed in the elastomer(s) at a loading of at least 20 phr, with a filler yield loss of no more than 10%, wherein the composite has a liquid content of no more than 10% by weight, on a total elastomer composite weight basis.

Process Steps (2), as follows, can be used to make a tire tread of the present invention:
(a) charging a first mixer with materials comprising one or more solid elastomer(s) and one or more wet filler(s), comprising the filler(s) and at least 15% by weight of liquid, on a total wet filler(s) weight basis;
(b) in one or more mixing steps, mixing the materials to form a mixture, and in at least one of said mixing steps, conducting said mixing at a mixer rotor tip speed of at least 0.6 m/s for at least 50% of the duration of mixing, while removing at least a portion of the liquid, optionally at least 50% by weight of the liquid, from the mixture by evaporation;
(c) discharging from the first mixer the mixture comprising at least 20 phr of the filler(s) dispersed in the elastomer(s), wherein the mixture has a liquid content that is reduced to an amount less than the initial liquid content, and wherein the mixture has a material temperature ranging from 100° C. to 180° C.;
(d) charging a second mixer with the mixture from (c) and mixing to obtain the elastomer composite, wherein the second mixer is operated at least one of the following conditions:
(i) a ram pressure of 5 psi or less;
(ii) a ram raised to at least 75% of its highest level;
(iii) a ram operated in floating mode;
(iv) a ram positioned such that it does not substantially contact the mixture;
(v) the mixer is ram-less; and/or
(vi) a fill factor of the mixture ranges from 25% to 70%; and
(e) discharging from the second mixer the elastomer composite having a liquid content of less than 3%, by weight, on total elastomer composite weight basis.

More specific examples of processes that can be used or included in making the tire treads of the present invention can be as follows.

One method of making a tire tread of the present invention can comprise:
(a) providing a wet-mix composite, said wet-mix composite prepared by:
(i) charging a mixer having one or more rotors with at least a solid elastomer and a wet filler comprising a filler and a liquid present in an amount ranging from 15% to 65% by weight based on total weight of wet filler;

(ii) in one or more mixing steps, mixing the at least the solid elastomer and the wet filler to form a mixture, and in at least one of said mixing steps conducting said mixing wherein the mixer has at least one temperature-control means that is set to a temperature, Tz, of 65° C. or higher, and removing at least a portion of the liquid from the mixture by evaporation; and (iii) discharging, from the mixer, the wet-mix composite comprising the filler dispersed in the elastomer at a loading of at least 20 phr with a filler yield loss of no more than 10%, wherein the wet-mix composite has a liquid content of no more than 5% by weight based on total weight of said composite;

(b) in at least one mixing stage, compounding the wet-mix composite into a tire tread formulation; and (c) fabricating the tire tread formulation into a tire tread.

Another method of making a tire tread of the present invention can comprise:

(a) providing a wet-mix composite, said wet-mix composite prepared by:

(i) charging a mixer with at least a solid elastomer comprising at least 50 wt % natural rubber and a wet filler comprising a filler and a liquid present in an amount of at least 15% by weight based on total weight of wet filler, wherein a fill factor, on a dry weight basis, of the at least the solid elastomer and the wet filler is no more than 68%, (ii) in one or more mixing steps, mixing the at least the solid elastomer and the wet particulate filler to form a mixture, and in at least one of said mixing steps, conducting said mixing at mixer temperatures controlled by at least one temperature-control means, and removing at least a portion of the liquid from the mixture by evaporation;

(iii) discharging, from the mixer, the composite comprising the filler dispersed in the elastomer at a loading of at least 20 phr with a filler yield loss of no more than 10%, wherein the composite has a liquid content of no more than 10% by weight based on total weight of said composite;

(b) in at least one mixing stage, compounding the wet-mix composite into a tire tread formulation; and (c) fabricating the tire tread formulation into a tire tread.

A further method of making a tire tread of the present invention can comprise:

(a) providing a wet-mix composite, said wet-mix composite prepared by:

(i) charging a mixer with at least a solid elastomer and a wet filler comprising a filler and a liquid present in an amount of at least 15% by weight based on total weight of wet filler (ii) in one or more mixing steps, mixing the at least the solid elastomer and the wet filler to form a mixture, and in at least one of said mixing steps conducting said mixing at mixer temperatures controlled by at least one temperature-control means with the one or more rotors operating at a tip speed of at least 0.6 m/s for at least 50% of the mixing time, and removing at least a portion of the liquid from the mixture by evaporation; and (iii) discharging, from the mixer, the wet-mix composite comprising the filler dispersed in the elastomer at a loading of at least 20 phr with a filler yield loss of no more than 10%, wherein the wet-mix composite has a liquid content of no more than 10% by weight based on total weight of said wet-mix composite;

(b) in at least one mixing stage, compounding the wet-mix composite into a tire tread formulation; and (c) fabricating the tire tread formulation into a tire tread.

An even further method of making a tire tread of the present invention can comprise:

(a) providing a wet-mix composite, said wet-mix composite prepared by:

(i) charging a first mixer having one or more rotors with at least a solid elastomer and a wet filler comprising a filler and a liquid present in an amount of at least 15% by weight based on total weight of wet filler;

(ii) in one or more mixing steps, mixing the at least the solid elastomer and the wet filler to form a mixture, and in at least one of said mixing steps, conducting said mixing at mixer temperatures controlled by at least one temperature-control means with the one or more rotors operating at a tip speed of at least 0.6 m/s for at least 50% of the mixing time, and removing at least a portion of the liquid from the mixture by evaporation, (iii) discharging, from the first mixer, the mixture comprising the filler dispersed in the elastomer at a loading of at least 20 phr, wherein the mixture has a liquid content ranging from 1% to 20% by weight based on total weight of said composite, wherein the composite has a material temperature ranging from 100° C. to 180° C.;

(iv) mixing the mixture from (iii) in a second mixer to obtain the composite, wherein the second mixer is operated under at least one of the following conditions:
a ram pressure of 5 psi or less;
a ram raised to at least 75% of its highest level;
a ram operated in floating mode;
a ram positioned such that it does not substantially contact the mixture;
the mixer is ram-less; and/or
a fill factor of the mixture ranges from 25% to 70%; and (v) discharging, from the second mixer, the wet-mix composite having a liquid content of less than 3% by weight based on total weight of said wet-mix composite;

(b) in at least one mixing stage, compounding the wet-mix composite into a tire tread formulation; and (c) fabricating the tire tread formulation into a tire tread.

An additional method of making a tire tread of the present invention can comprise:

(a) providing a wet-mix composite, said wet-mix composite prepared by:

(i) charging a first mixer having one or more rotors with at least a solid elastomer and a wet filler comprising a filler and a liquid present in an amount of at least 15% by weight based on total weight of wet filler;

(ii) in one or more mixing steps, mixing the at least the solid elastomer and the wet filler to form a mixture, and in at least one of said mixing steps, conducting said mixing at mixer temperatures controlled by at least one temperature-control means and applying an average specific power of at least 2.5 kW/kg over mixing time, and removing at least a portion of the liquid from the mixture by evaporation;

(iii) discharging, from the first mixer, the mixture comprising the filler dispersed in the elastomer at a loading of at least 20 phr, wherein the mixture has a liquid content that is reduced to an amount less than the liquid content at the beginning of step (ii), and wherein the mixture has a material temperature ranging from 100° C. to 180° C.;
(iv) mixing the mixture from (iii) in a second mixer to obtain the composite, wherein the second mixer is operated under at least one of the following conditions:
a ram pressure of 5 psi or less;
a ram raised to at least 75% of its highest level;
a ram operated in floating mode;
a ram positioned such that it does not substantially contact the mixture;
the mixer is ram-less; and/or
a fill factor of the mixture ranges from 25% to 70%; and
(v) discharging, from the second mixer, the composite having a liquid content of less than 3% by weight based on total weight of said composite;
(b) in at least one mixing stage, compounding the wet-mix composite into a tire tread formulation; and
(c) fabricating the tire tread formulation into a tire tread.

In addition, as used herein, the term "wet-mixed composite" means elastomer composite materials manufactured from solid elastomer and wet filler by optional, further processing steps combined with the set of process steps (1) or process steps (2) or any of the other processes described herein. The further processing steps including, but not limited to:
(a) Selection of fillers wherein at least 50 wt %, or at least 40 wt %, of the fillers comprises carbon black materials; and/or the carbon black material is dispersed in the elastomer(s) at a loading of 30 to 150 phr; and/or the carbon black material has an STSA ranging from 60 $m^2/g$ to 200 $m^2/g$ and/or a COAN ranging from 60 mL/100 g to 120 mL/100 g;
(b) Selection of a liquid that is volatile at elastomer composite mixing temperatures; and/or selecting a liquid comprising water; and/or selecting a liquid comprising a component selected from acids, bases, salts, surfactants and processing aids;
(c) Selection of mixer conditions to yield total specific energy of mixing of at least 1,400 KJ/Kg elastomer composite; and/or applying energy to the mixer to yield a liquid time average release rate of 0.01 to 0.14 kg/(min·kg) on a kg dry weight basis of the elastomer composite; and/or a discharged elastomer composite liquid content of no more than 5 wt % by total weight of elastomer composite;
(d) Selection of a batch, semi-continuous and/or continuous mixer and mixing steps; and/or omitting one or more rubber chemicals from the mixing steps and the discharged elastomer composite; and/or operation of the second mixer at a ram pressure of 5 psi or less and/or a temperature, Tz, ranging from 60° C. to 110° C., or ranging from 65° C. to 100° C., or ranging from 50° C. to 100° C.; and/or operation of the first mixer at a fill factor of 50 to 70%; and/or
(e) Selection of mixers as second mixers operated under at least one of the following conditions, and
(i) a ram pressure of 5 psi or less;
(ii) a ram raised to at least 75% of its highest level;
(iii) a ram operated in floating mode;
(iv) a ram positioned such that it does not substantially contact the mixture;
(v) the mixer is ram-less; and/or
(vi) a fill factor of the mixture ranges from 25% to 70%.

In addition, as used herein, the term "wet-mixed composite" means any elastomer composite materials manufactured from solid elastomer and wet filler by any process disclosed in U.S. provisional patent application 62/857,779 and PCT Application No. PCT/US20/36168, entitled "METHODS OF PREPARING A COMPOSITE HAVING ELASTOMER AND FILLER," which are hereby incorporated by reference.

In the description of this invention, the terms "rubber" and "elastomer" are used interchangeably, unless otherwise prescribed. The terms "rubber composition", "compound", "compounded rubber", and "rubber compound", where used in herein, are used interchangeably to refer to "rubber which has been blended or mixed with various ingredients" and the term "compound" relates to a "rubber composition" unless otherwise indicated. Such terms are well known to those having skill in the rubber mixing or rubber compounding art. The term "phr" refers to parts of a respective material per 100 parts by dry weight of rubber, or elastomer. The terms "cured" and "vulcanized" or "vulcanizate" are used interchangeably for cross-linked rubber compounds in tires, unless otherwise indicated.

The tire tread of the invention is characterized by superior filler dispersion. The filler dispersion can be measured in cured or vulcanized rubber compounds by techniques using optical microscopy in transmission mode for determining a macrodispersion value "V" representing the area percentage of undispersed carbon black particles larger than 10 μm. Such composites have unique product attributes. A tire tread of the invention comprising at least one elastomer and 20-80 phr of at least one filler, the filler comprising at least one carbon black, can be characterized by a macrodispersion value V, a modulus ratio, a percent elongation at break, or a Tan delta at 60° C., as determined by typical industry testing methods described in the Examples below.

Solid Elastomer

The solid elastomer useful in the wet-filler composite can include, but is not limited to, any solid form of natural elastomers or synthetic elastomers suitable for tire components or tire treads.

As an option, the solid elastomer used in the composite of the invention can be at least one natural rubber and treated and functionalized derivatives thereof. For example, natural rubber may be treated to chemically or enzymatically modify or reduce various non-rubber components, or the rubber molecules themselves may be modified with various monomers or other chemical groups such as chlorine. As an option, epoxidized natural rubber can be used and natural rubber having a nitrogen content of at most 0.3 wt %, as described in PCT Publ. No. WO 2017/207912. Technical descriptions of natural rubbers useful herein are widely available, such as in Rubber World Magazine's Blue Book published by Lippincott and Peto, Inc. (Akron, Ohio, USA). The solid elastomer used in the composite of the invention can be at least one elastomer selected from natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, isobutylene-based elastomers, polychloroprene rubber, nitrile rubber, hydrogenated nitrile rubber, polysulfide rubber, polyacrylate elastomers, fluoroelastomers, perfluoroelastomers, silicone elastomers, and blends thereof.

Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. Particular suitable synthetic rubbers include: copolymers of styrene and butadiene comprising from about 10 percent by weight to about 70 percent by weight of styrene and from about 90 to about 30 percent by weight of butadiene such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alpha-methylene carboxylic acids and the esters and amides thereof, such as acrylic acid and dialkylacrylic acid amide. Also suitable for use herein are copolymers of ethylene and other high alpha olefins such as propylene, 1-butene, and 1-pentene. Other polymers are disclosed in U.S. Patent Application Publ. No. 2018/0282523 and European Patent 2423253B1, the disclosures of which are incorporated herein by reference. Other polymers include silicone-based elastomers or hybrid systems that have silicones and hydrocarbon domains. With regard to the solid elastomer that is used and mixed with the wet filler, the solid elastomer can be considered a dry elastomer or substantially dry elastomer. The solid elastomer has a water content (or moisture content) of 5 wt % or less, based on the total weight of the solid elastomer, such as 4 wt % or less, 3 wt % or less, 2 wt % or less, 1 wt % or less, or from 0.1 wt % to 5 wt %, 0.5 wt % to 5 wt %, 1 wt % to 5 wt %, 0.5 wt % to 4 wt %, and the like. The solid elastomer can be entirely elastomer (with the starting water content of 5 wt % or less) or can be a solid elastomer masterbatch that also includes one or more fillers and/or other components. For instance, the solid elastomer can be from 50 wt % to 99.9 wt % elastomer with 0.1 wt % to 50 wt % filler pre-dispersed in the elastomer on a dry weight basis, in which the pre-dispersed filler is present in addition to the wet filler incorporated into the composite.

With regard to a solid elastomer masterbatch that is used and mixed with the wet filler, the solid elastomer masterbatch can be considered a dry elastomer masterbatch or substantially dry elastomer masterbatch. The solid elastomer masterbatch has a water content (or moisture content) of 5 wt % or less, 4 wt % or less, 3 wt % or less, 2 wt % or less, 1 wt % or less, or from 0.1 wt % to 5 wt %, 0.5 wt % to 5 wt %, 1 wt % to 5 wt %, 0.5 wt % to 4 wt %, and the like.

The solid elastomer masterbatch (e.g., the starting solid elastomer masterbatch) is an elastomer that includes one or more fillers and, optionally, other components. For instance, the solid elastomer masterbatch can comprise 1 phr to 100 phr filler pre-dispersed in the elastomer, or 20 phr to 80 phr filler pre-dispersed in the elastomer, or 30 phr to 70 phr filler pre-dispersed in the elastomer, or 40 phr to 60 phr filler pre-dispersed in the elastomer, and the like. Other components, such as additional elastomer, antioxidant and other rubber chemicals and additives, can be present in the solid elastomer in amounts from 0.1 phr to less than 50 phr. The solid elastomer masterbatch can contain any elastomer, any filler, any additive and any combination thereof, in any amounts, as described and exemplified herein and as known in the art. The total filler contained in the final rubber compound includes pre-dispersed filler in the solid elastomer masterbatch in addition to the wet filler added. The solid elastomer masterbatch may be a dry and/or wet-mixed composite, or a dried mixture or compound made by a dry masterbatch process.

Secondary elastomeric materials may be combined with the solid elastomer (or masterbatch) prior to, simultaneously with, or after the wet filler is combined with the solid elastomer (or masterbatch). Secondary elastomeric materials can be at least one solid elastomer; at least one additional solid elastomer masterbatch. Secondary elastomer materials can comprise the same elastomer as the solid elastomer, or at least one different elastomer, selected from one or more of the elastomers described herein or known in the art. Secondary elastomer materials can comprise at least one rubber chemical as described herein or known in the art.

Filler

In preparing the rubber compounds for tire treads of the invention, wet-mixed composites can be used. Wet-mixed composites utilizing a wet filler (e.g., comprising a filler and a liquid) allows the batch time and temperature to be controlled beyond that attainable with known dry mixing processes, and offers other benefits such as enhancing filler dispersion and/or facilitating rubber-filler interactions and/or improving rubber compound performance. The wet filler can be effective when sufficient liquid is used to wet a substantial portion or substantially all of the filler surfaces prior to mixing with solid elastomer. In general, and as described here, the mixing process can be managed by controlling one or more mixer or process parameters, such as mixer surface temperatures and/or rotor speeds, fill factor, the incorporation of rubber chemicals (if any) at later times of the mixing cycle, composite discharge temperatures, and/or the application of two or more mixing stages.

The methods for preparing a wet-mixed composite include the step of charging or introducing into a rubber mixer at least a solid elastomer and a wet filler, e.g., a) one or more solid elastomers and b) one or more fillers wherein at least one filler or a portion of at least one filler has been wetted with a liquid prior to mixing with the solid elastomer (wet filler). The combining of the solid elastomer with wet filler forms a mixture during the mixing step(s). The method further includes, in one or more mixing steps, conducting said mixing wherein at least a portion of the liquid is removed by evaporation or an evaporation process that occurs during the mixing. The liquid of the wet filler is capable of being removed by evaporation (and at least a portion is capable of being removed under the recited mixing conditions) and can be a volatile liquid, e.g., volatile at bulk mixture temperatures. For example, the liquid can have a boiling point at 1 atm. of from 60° C. to 110° C., from 60° C. to 100° C., from 60° C. to 90° C., from 90° C. to 110° C., from 90° C. to 100° C., from 95° C. to 120° C., or from 95° C. to 110° C. For example, a volatile liquid can be distinguished from oils (e.g., extender oils, process oils) which can be present during at least a portion of the mixing as such oils are meant to be present in the composite that is discharged and thus, do not evaporate during a substantial portion of the mixing time.

With respect to the wet filler, in one embodiment, the wet filler has the consistency of a solid. Preferably, dry filler is wetted only to an extent such that the resulting wet filler maintains the form of a powder, particulates, pellet, cake, or paste, or similar consistency and/or has the appearance of a powder, particulates, pellet, cake, or paste. The wet filler does not flow like a liquid (e.g., at zero applied stress). As an option, the wet filler can maintain a shape at 25° C. when molded into such a shape, whether it be the individual particles, agglomerates, pellets, cakes, or pastes. The wet filler is not a composite made by a liquid masterbatch process and is not any other pre-blended composite of filler dispersed in a solid elastomer in which the elastomer is the continuous phase. In another embodiment, the wet filler can be a slurry. In yet another embodiment, the wet filler is not a slurry of filler and does not have the consistency of a liquid or slurry.

In their dry state, fillers may contain small amounts of liquid (e.g. water) adsorbed onto its surfaces. For example, carbon black can have 1 to 3 wt % or 4 wt % of moisture and precipitated silica can have a moisture content of 4 to 7 wt %. Such fillers are referred to herein as dry or non-wetted fillers. For the present wet fillers, additional liquid has been added to the filler and is present on the surfaces of the filler, including inner surfaces or pores accessible to the liquid. During mixing at least a portion of the liquid is removed by evaporation as the wet filler is being dispersed in the solid elastomer, and the surfaces of the filler can then become available to interact with the solid elastomer. The wet filler can have a liquid content of at least 20% by weight relative to the total weight of the wet filler, e.g., at least 30%, at least 40%, at least 50% by weight, or from 20% to 80%, from 30% to 80%, from 30% to 70%, from 30% to 60%, from 40% to 80%, from 40% to 70%, from 40% to 60%, by weight relative to the total weight of the wet filler.

The liquid used to wet the filler can be, or include, an aqueous liquid, such as, but not limited to, water. The liquid can include at least one other component, such as, but not limited to, a base(s), an acid(s), a salt(s), a solvent(s), a surfactant(s), a coupling agent(s), and/or a processing aid(s) and/or any combinations thereof.

As an option, the mixture can further include one or more non-wetted filler (e.g., any filler that is not wetted as described herein, such as dry filler, such as a filler having no more than 10 wt % liquid).

The filler used to make the wet-filler composite can be any conventional filler used with elastomers such as reinforcing fillers including, but not limited to, carbon black, silica, a filler comprising carbon black, a filler comprising silica, and/or any combinations thereof. The filler can be particulate or fibrous or plate-like. For example, particulate filler is made of discrete bodies. Such fillers can often have an aspect ratio (e.g., length to diameter) of 3:1 or less, or 2:1 or less, or 1.5:1 or less. Fibrous fillers can have an aspect ratio of, e.g., 2:1 or more, 3:1 or more, 4:1 or more, or higher. Typically, fillers used for reinforcing elastomers have dimensions that are microscopic (e.g., hundreds of microns or less) or nanoscale (e.g., less than 1 micron). In the case of carbon black, the discrete bodies of particulate carbon black refer to the aggregates or agglomerates formed from primary particles, and not to the primary particles themselves. In other embodiments, the filler can have a plate-like structure such as graphenes and reduced graphene oxides.

The carbon black used in the tire tread of the invention can be untreated carbon black or treated carbon black or a mixture thereof. The filler can be or include wet carbon black in the form of pellets, fluffy powder, granules, and/or agglomerates. Wet carbon black can be formed into pellets, granules, or agglomerates in, e.g., a pelletizer, a fluidized bed or other equipment to make the wet filler.

The filler used in the tire tread of the invention can be chemically treated (e.g. chemically treated carbon black, chemically treated silica, silicon-treated carbon black) and/or chemically modified. The filler can be or include carbon black having an attached organic group(s). The filler can have one or more coatings present on the filler (e.g. silicon-coated materials, silica-coated material, carbon-coated material). The filler can be oxidized and/or have other surface treatments. The filler can comprise at least one material that is selected from carbonaceous materials, carbon black, silica, nanocellulose, lignin, nanoclays, metal oxides, metal carbonates, pyrolysis carbon, reclaimed carbon, recovered carbon, rCB, graphenes, graphene oxides, reduced graphene oxide, carbon nanotubes, single-wall carbon nanotubes, multi-wall carbon nanotubes, or combinations thereof, or corresponding coated materials or chemically-treated materials thereof. There is no limitation with respect to the type of silica, carbon black, or other filler that can be used. More details concerning the filler are provided in other sections herein. The filler can be or include a blend of carbon black and silica in any weight ratio, such as weight ratio ranges of 1:99 to 99:1 or 25:75 to 75:25 or 45:55 to 55:45.

The wet carbon black can be one or more of the following:
never-dried carbon black pellets; and/or
dried carbon black pellets that have been rewetted, such as with water in a pelletizer; and/or
dried carbon black pellets that have been ground and then rewetted with water in a pelletizer; and/or
dried carbon black pellets combined with water; and/or
fluffy powder, granules, or agglomerates combined with water.

In typical carbon black manufacturing, carbon black is initially prepared as dry, fine particulate (fluffy) material. The fluffy carbon black can be densified by a conventional pelletizing process, e.g., by combining the carbon black with a liquid such as adding water and feeding the mixture to a pin pelletizer. Pin pelletizers are well known in the art and include the pin pelletizer described in U.S. Pat. No. 3,528,785. The resulting wet pellets are then heated under controlled temperature and time parameters to remove liquid from the pellets before further handling and shipping. In an alternative process, carbon black pellets can be manufactured by a process that omits a drying step. In such a process, pelletized carbon black contains process water of at least 20% by weight based on a total weight of wet carbon black. These "never-dried carbon black" pellets and can be used directly in the claimed processes after pelletizing. Alternatively, carbon black pellets that have been dried (such as commercially available carbon black pellets) can be rewetted in a pelletizer. The pellets can be granulated, ground, classified, and/or milled, e.g., in a jet mill. The resulting carbon black is in fluffy form and can be re-pelletized in a pelletizer or otherwise compressed or agglomerated in the presence of water to wet the carbon black. Alternatively, the fluffy carbon black can be compressed into other forms, e.g., in a brick form, with equipment known in the art. As another option, the fluffy carbon black can be wetted, e.g., by using a fluidized bed, sprayer, mixer, or rotating drum, and the like. Where the liquid is water, never-dried carbon black or carbon black that has been rewetted can achieve a water content ranging from 20% to 80%, from 30% to 70% by weight or other ranges, e.g., from 55% to 60% by weight, with respect to the total weight of the wet carbon black.

The carbon black used in the tire tread of the present invention can be any grade of reinforcing carbon blacks and semi-reinforcing carbon blacks. Examples of ASTM grade reinforcing grades are N110, N121, N134, N220, N231, N234, N299, N326, N330, N339, N347, N351, N358, and N375 carbon blacks. Examples of ASTM grade semi-reinforcing grades are N539, N550, N650, N660, N683, N762, N765, N774, N787, N990 carbon blacks and/or N990 grade thermal blacks.

The carbon black can have any statistical thickness surface area (STSA) such as ranging from 20 m$^2$/g to 250 m$^2$/g or higher, for instance, at least 60 m$^2$/g, such as from 60 m$^2$/g to 150 m$^2$/g or from 70 m$^2$/g to 250 m$^2$/g, or 80 m$^2$/g to 200 m$^2$/g or from 90 m$^2$/g to 200 m$^2$/g, or from 100 m$^2$/g to 180 m$^2$/g, from 110 m$^2$/g to 150 m$^2$/g, from 120 m$^2$/g to 150 m$^2$/g and the like, from 140 m$^2$/g to 180 m$^2$/g, from 150 m$^2$/g to 180 m$^2$/g, from 140 m$^2$/g to 170 m$^2$/g, from 150 m$^2$/g to 170 m$^2$/g, from 140 m$^2$/g to 160 m$^2$/g, or from 150 m$^2$/g to 160 m$^2$/g. STSA (statistical thickness surface area) is determined based on ASTM Test Procedure D-6556 (measured by nitrogen adsorption).

The carbon black can have a compressed oil absorption number (COAN) ranging from about 30 mL/100 g to about 150 mL/100 g, e.g., from about 30 mL/100 g to about 125 mL/100 g, from about 30 mL/100 g to about 115 mL/100 g, from about 50 mL/100 g to about 150 mL/100 g, from about 50 mL/100 g to about 125 mL/100 g, from about 50 mL/100 g to about 115 mL/100 g, from about 70 mL/100 g to about 150 mL/100 g, from about 70 mL/100 g to about 125 mL/100 g, from about 70 mL/100 g to about 115 mL/100 g, from about 80 mL/100 g to about 150 mL/100 g, from about 80 mL/100 g to about 125 mL/100 g, from about 80 mL/100 g to about 115 mL/100 g or from about 80 mL/100 g to about 100 mL/100 g. Compressed oil absorption number (COAN) is determined according to ASTM D3493. As an option, the carbon black can have a STSA ranging from 60 m$^2$/g to 1555 m$^2$/g with a COAN of from 70 mL/100 g to 115 mL/100 g.

As stated, the carbon black can be a rubber black, and especially a reinforcing grade of carbon black or a semi-reinforcing grade of carbon black. Carbon blacks sold under the Regal®, Black Pearls®, Spheron®, Sterling®, Propel®, Endure®, and Vulcan® trademarks available from Cabot Corporation, the Raven®, Statex®, Furnex®, and Neotex® trademarks and the CD and HV lines available from Birla Carbon (formerly available from Columbian Chemicals), and the Corax®, Durax®, Ecorax®, and Purex® trademarks and the CK line available from Orion Engineered Carbons (formerly Evonik and Degussa Industries), and other fillers suitable for use in rubber or tire applications, may also be exploited for use with various implementations. Suitable chemically functionalized carbon blacks include those disclosed in WO 96/18688 and US2013/0165560, the disclosures of which are hereby incorporated by reference. Mixtures of any of these carbon blacks may be employed. Carbon blacks having surface areas and structures beyond the ASTM grades and typical values selected for mixing with rubber may be used in the tire tread of the invention, such as those described in U.S. Publ. No. 2018/0282523, the disclosure of which is incorporated herein by reference.

The carbon black can be an oxidized carbon black, such as a carbon black that has been surface treated using an oxidizing agent. Oxidizing agents include, but are not limited to, air, oxygen gas, ozone, NO$_2$ (including mixtures of NO$_2$ and air), peroxides such as hydrogen peroxide, persulfates, including sodium, potassium, or ammonium persulfate, hypohalites such a sodium hypochlorite, halites, halates, or perhalates (such as sodium chlorite, sodium chlorate, or sodium perchlorate), oxidizing acids such a nitric acid, and transition metal containing oxidants, such as permanganate salts, osmium tetroxide, chromium oxides, or ceric ammonium nitrate. Mixtures of oxidants may be used, particularly mixtures of gaseous oxidants such as oxygen and ozone. In addition, carbon blacks prepared using other surface modification methods to introduce ionic or ionizable groups onto a pigment surface, such as chlorination and sulfonation, may also be used. Processes that can be employed to generate oxidized carbon blacks are known in the art and several types of oxidized carbon black are commercially available.

The carbon black can be a furnace black, a gas black, a thermal black, an acetylene black, a lamp black, a plasma black, or a reclaimed black (or rCB), or a carbon product containing silicon-containing species, and/or metal containing species and the like. The carbon black can be, for purposes of the present invention, a multi-phase aggregate comprising at least one carbon phase and at least one metal-containing species phase or silicon-containing species phase, i.e., silicon-treated carbon black. In silicon-treated carbon black, a silicon containing species, such as an oxide or carbide of silicon, is distributed through at least a portion of the carbon black aggregate as an intrinsic part of the carbon black. Silicon-treated carbon blacks are not carbon black aggregates which have been coated or otherwise modified, but actually represent dual-phase aggregated particles. One phase is carbon, which will still be present as graphitic crystallite and/or amorphous carbon, while the second phase is silica, and possibly other silicon-containing species). Thus, the silicon-containing species phase of the silicon treated carbon black is an intrinsic part of the aggregate, distributed throughout at least a portion of the aggregate. ECOBLACK™ silicon-treated carbon blacks are available from Cabot Corporation. The manufacture and properties of these silicon-treated carbon blacks are described in U.S. Pat. No. 6,028,137, the disclosure of which is incorporated herein by reference.

The silicon-treated carbon black can include silicon-containing regions primarily at the aggregate surface of the carbon black, but still be part of the carbon black and/or the silicon-treated carbon black can include silicon-containing regions distributed throughout the carbon black aggregate. The silicon-treated carbon black can be oxidized. The silicon-treated carbon black can contain from about 0.1% to about 50% silicon by weight, based on the weight of the silicon-treated carbon black. These amounts can be from about 0.5 wt % to about 25 wt %, from about 1 wt % to about 15 wt % silicon, from about 2 wt % to about 10 wt %, from about 3 wt % to about 8 wt %, from about 4 wt % to about 5 wt % or to about 6 wt %, all based on the weight of the silicon-treated carbon black.

One of skill in the art will recognize that, separately from the silicon content of the silicon-treated carbon black, the surface of the particle may also have varying amounts of silica and carbon black. For example, the surface area of the silicon-treated carbon black may include from about 5% to about 95% silica, for example, from about 10% to about 90%, from about 15% to about 80%, from about 20% to about 70%, from about 25% to about 60%, from about 30% to about 50%, or from about 35% to about 40%, for example, up to about 20% or up to about 30% silica. The amount of silica at the surface may be determined by the difference between the surface areas of the particles as measured by iodine number (ASTM D-1510) and nitrogen adsorption (i.e., BET, ASTM D6556).

As another option, the filler, e.g., carbon black, can be chemically treated. For example, the carbon black can have attached at least one organic group. Attachment can occur via a diazonium reaction where the at least one organic group has a diazonium salt substituent as detailed, for instance, in U.S. Pat. Nos. 5,554,739; 5,630,868; 5,672,198; 5,707,432; 5,851,280; 5,885,335; 5,895,522; 5,900,029; 5,922,118, the disclosure of which are incorporated herein by reference.

For tire treads of the invention, a combination of more than one filler can be used in the composite or compound comprising the composite of the invention. The combination can comprise rubber reinforcing carbon black(s) and silica, e.g., precipitated silica, and the combination may comprise a weight ratio of at least 2.7 to 1.0 of carbon black to silica.

With regard to the filler, one or more types of silica, or any combination of silica(s), can be used in any embodiment of the present invention. The silica can include or be precipitated silica, fumed silica, silica gel, and/or colloidal silica. The silica can be or include untreated silica and/or chemically-treated silica. The silica can be suitable for reinforcing elastomer composites and can be characterized by a Brunaur Emmett Teller surface area (BET) of about 20 $m^2/g$ to about 450 $m^2/g$; about 30 $m^2/g$ to about 450 $m^2/g$; about 30 $m^2/g$ to about 400 $m^2/g$; or about 60 $m^2/g$ to about 250 $m^2/g$, from about 60 $m^2/g$ to about 250 $m^2/g$, from about 80 $m^2/g$ to about 200 $m^2/g$. Highly dispersible precipitated silica can be used as the filler in the present methods. Highly dispersible precipitated silica ("HDS") is understood to mean any silica having a substantial ability to dis-agglomerate and disperse in an elastomeric matrix. Such dispersion determinations may be observed in known manner by electron or optical microscopy on thin sections of elastomer composite. Examples of commercial grades of HDS include, Perkasil® GT 3000GRAN silica from WR Grace & Co, Ultrasil® 7000 silica from Evonik Industries, Zeosil® 1165 MP, 1115 MP, Premium and 1200 MP silica from Solvay S.A., Hi-SHED EZ 160G silica from PPG Industries, Inc., and Zeopol® 8741 or 8745 silica from Evonik Industries. Conventional non-HDS precipitated silica may be used as well. Examples of commercial grades of conventional precipitated silica include, Perkasil® KS 408 silica from WR Grace & Co, Zeosil® 175 GR silica from Solvay S.A., Ultrasil® VN3 silica from Evonik Industries, and Hi-SHED 243 silica from PPG Industries, Inc. Precipitated silica with surface attached silane coupling agents may also be used. Examples of commercial grades of chemically-treated precipitated silica include Agilon®400, 454, or 458 silica from PPG Industries, Inc. and Coupsil silicas from Evonik Industries, for example Coupsil® 6109 silica.

While the liquid amount in the filler as described above can equally apply to silica, as a more particular example, when silica is used as the wet filler in part or in whole as the wet filler, the silica can have liquid present in an amount of from about 25 wt % to about 75 wt %, e.g., from about 30% to about 75%, from about 40% to about 75%, from about 45% to about 75%, from about 50% to about 75%, from about 30% to about 70%, from about 40% to about 70%, from about 45% to about 70%, from about 50% to about 70%, from about 30% to about 65%, from about 40% to about 65%, from about 45% to about 65%, from about 50% to about 65%, from about 30% to about 60% by weight, from about 40% to about 60%, from about 45% to about 60%, or from about 50% to about 60%, by weight, based on the weight of the total wet filler or based on the weight of just the wet silica present.

Typically the silica (e.g., silica particles) have a silica content of at least 20 wt %, at least 25 wt %, at least 30 wt %, at least 35 wt %, at least 40 wt %, at least 50 wt %, at least 60 wt %, at least 70 wt %, at least 80 wt %, at least 90 wt %, or almost 100 wt % or 100 wt %, or from about 20 wt % to about 100 wt %, all based on the total weight of the particle. Any of the silica(s) can be chemically functionalized, such as to have attached or adsorbed chemical groups, such as attached or adsorbed organic groups. Any combination of silica(s) can be used. The silica can be in part or entirely a silica having a hydrophobic surface, which can be a silica that is hydrophobic or a silica that becomes hydrophobic by rendering the surface of the silica hydrophobic by treatment (e.g., chemical treatment). The hydrophobic surface may be obtained by chemically modifying the silica particle with hydrophobizing silanes without ionic groups, e.g., bis-triethoxysilylpropyltetrasulfide. Suitable hydrophobic surface-treated silica particles for use herein may be obtained from commercial sources, such as Agilon® 454 silica and Agilon® 400 silica, from PPG Industries. Silica having low surface silanol density, e.g., silica obtained through dehydroxylation at temperatures over 150° C. via, for example, a calcination process, may be used herein. An intermediate form of silica obtained from a precipitation process in a cake or paste form, without drying (a never-dried silica) may be added directly to a mixer as the wet filler, thus eliminating complex drying and other downstream processing steps used in conventional manufacture of precipitated silicas.

In any embodiment and in any step, a coupling agent can be introduced in any of the steps (or in multiple steps or locations) as long as the coupling agent has an opportunity to become dispersed in the composite. The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl)tetrasulfane (e.g., Si 69 from Evonik Industries, Struktol SCA98 from Struktol Company), bis(3-triethoxysilylpropyl)disulfane (e.g., Si 75 and Si 266 from Evonik Industries, Struktol SCA985 from Struktol Company), 3-thiocyanatopropyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bis(2-methyl-2-nitropropyl)-1,6-diaminohexane, S-(3-(triethoxysilyl)propyl) octanethioate (e.g., NXT coupling agent from Momentive, Friendly, WV), and/or coupling agents that are chemically similar or that have the one or more of the same chemical groups. Additional specific examples of coupling agents, by commercial names, include, but are not limited to, NXT Z and NXT Z-50 from Momentive, VP Si 363 from Evonik Industries. The coupling agents described herein could be used to provide hydrophobic surface modification of silica (pre-coupled or pre-treated silica). It is to be appreciated that any combination of elastomers, additives, and additional composite may be added to the elastomer composite, for instance in a compounder.

The amount of silica (in parts per hundred of rubber, or phr) present in the elastomer composite formed can be from about 0 phr to about 200 phr, from about 1 phr to about 200 phr, or from 1 phr to 10 phr, or from 1 phr to 20 phr, or from 1 phr to 25 phr, or from 5 to 190 phr, or from 10 to 180 phr, or from about 15 phr to about 180 phr, from about 55 phr to about 150 phr, from about 10 phr to from about 100 phr, from about 20 phr to from about 150 phr, from about 30 phr to from about 100 phr, from about 25 phr to about 100 phr, from about 25 phr to about 80 phr, from about 35 phr to about 115 phr, from about 35 phr to about 100 phr, from about 40 phr to about 110 phr, from about 40 phr to about 100 phr, from about 40 phr to about 90 phr, from about 40 phr to about 80 phr, and the like.

Other fillers are disclosed in U.S. Publ. No. 2018/0282523 and European Patent 2423253B1, the disclosures of which are incorporated herein by reference.

The amount of filler (e.g. wet filler alone or wet filler with other filler) that is loaded into the wet-filler composite and the tread rubber compound can range from 30 phr to 150 phr, such as from about 5 phr to 100 phr, 10 phr to 100 phr, 20 phr to 100 phr, 30 phr to 100 phr, 40 phr to 100 phr, 50 phr to 100 phr, or 5 phr to 70 phr, 10 phr to 70 phr, 20 phr to 70 phr, 30 phr to 70 phr, 35 phr to 70 phr, 40 phr to 70 phr, 5 phr to 65 phr, 10 phr to 65 phr, 20 phr to 65 phr, 30 phr to 65 phr, 35 phr to 65 phr, 40 phr to 65 phr, 5 phr to 60 phr, 10 phr to 60 phr, 20 phr to 60 phr, 30 phr to 60 phr, 35 phr to 60 phr, 40 phr to 60 phr, 5 phr to 50 phr, or other amounts within or outside of one or more of these ranges. Other ranges include from about 15 phr to about 180 phr, about 20 phr to about 150 phr, about 25 phr to about 80 phr, about 30 phr to about 150 phr, about 35 phr to about 115 phr, about 35 phr to about 100 phr, about 40 phr to about 100 phr, about 40 phr to about 90 phr, about 40 phr to about 80 phr, about 29 phr to about 175 phr, about 40 phr to about 110 phr, about 50 phr to about 175 phr, about 60 phr to about 175 phr, and the like. The filler can be any filler disclosed herein, such as carbon black, silica, or silicon-treated carbon black, whether alone or with one or more other fillers.

As an example, the carbon black can be dispersed in the elastomer at a loading ranging from 30 phr to 70 phr, or from 40 phr to 65 phr, or from 40 phr to 60 phr. As a more specific example, with the elastomer being natural rubber alone or with one or more other elastomers, and the filler being carbon black alone or with one or more other fillers (e.g., silica or silicon-treated carbon black), the carbon black can be dispersed in the natural rubber at a loading ranging from 30 phr to 70 phr, or from 40 phr to 65 phr, or from 40 phr to 60 phr.

Tires and treads of the invention can be made with compounds prepared by curing certain wet-mixed composites. Such composites can be made by charging a mixer with solid elastomer and wet filler in one or multiple steps or additions. The solid elastomer can be masticated and brought to a temperature of about 90° C. or 100° C. or higher prior to charging the wet filler into the mixer. Alternatively, the solid elastomer can be masticated with at least a portion of the wet filler to a temperature of about 90° C. or 100° C. or higher prior to the start of any actual dispersion of filler.

With regard to mixing, the mixing can be performed in one or more mixing steps. Mixing commences when at least the solid elastomer and wet filler are charged to the mixer and energy is applied to a mixing system that drives one or more rotors of the mixer. The one or more mixing steps can occur after the charging step is completed, or can overlap with the charging step for any length of time. For purposes of the present invention, the charging step is completed before the mixing step is completed.

During mixing at least some liquid present in the mixture and/or wet filler introduced is removed at least in part by evaporation. As an option, the majority (by wt %) of any liquid removed from the mixture occurs by evaporation. For example, at least 50 wt % of liquid is removed by evaporation, based on total weight of liquid removed during the mixing. The total weight of liquid removed can be determined from the difference between liquid content of the wet filler and any liquid remaining in the composite when discharged from the mixer plus any liquid present in, or drained from, the mixer when the composite is discharged from the mixer. For example, when the composite is discharged, additional liquid (e.g., unevaporated liquid) may also be discharged, either with or within the composite or through outlets provided in the mixer. Liquid removal by evaporation can represent at least at least 70 wt %, at least 80 wt %, or from 51 wt % to 100 wt %, or from 51 wt % to 95 wt % of the total liquid contained in the wet filler that is charged to the mixer. As an option, the one or more mixing steps or stages can further remove a portion of the liquid from the mixture by expression, compaction, and/or wringing, or any combinations thereof.

With regard to the mixer that can be used for preparing composites, any suitable mixer can be utilized that is capable of combining (e.g., mixing together or compounding together) a filler with solid elastomer. The mixer(s) can be a batch mixer or a semi-continuous or a continuous mixer. A combination of mixers and processes can be utilized, and the mixers can be used in tandem sequence and/or integrated with other processing equipment. The mixer can be an internal or closed mixer or an open mixer, or an extruder or a continuous compounder or a kneading mixer or a combination thereof. The mixer can be capable of incorporating filler into solid elastomer and/or capable of dispersing the filler in the elastomer and/or distributing the filler in the elastomer. Any one or combination of commercial mixers to produce rubber compounds can be used in the present methods.

The top of a typical batch mixing chamber can be raised and lowered by a pneumatic or hydraulic piston, commonly referred to as a "floating weight" or a "ram". The ram is raised to feed the materials (e.g., at least solid elastomer and wet filler) and lowered to apply pressure to the mixture and confine the mixture within the mixing chamber. Typically, the fill factor of the batch and the ram pressure are selected so the ram can reach its lowermost position to minimize the clearance between the ram and the rotors, which can enable good filler dispersion. The vertical distance of the ram above its minimum position is known as the "ram deflection."

The mixer can have one or more rotors (at least one rotor). For example, each rotor can rotate inside its own cylindrical chamber, which can be connected to the chamber(s) of the other rotor(s). The shafts are controlled by a mixing system to which energy (electrical energy) is applied. A rotor can be considered a device that imparts energy to the mixture and/or the components that form the mixture. The rotors can be designed with inner circuits or channels of steam or water or other fluid for cooling and/or heating. The at least one rotor or the one or more rotors can be screw-type rotors, intermeshing rotors, tangential rotors, kneading rotor(s), rotors used for extruders, a roll mill that imparts significant total specific energy, or a creper mill.

The one or more mixing steps can be a single mixing step, e.g., a one-stage or single stage mixing step or process, in which the mixing is performed under one or more of the following conditions: at least one of the mixer temperatures are controlled by temperature controlled means with one or more rotors operating at a tips speed of at least 0.6 m/s for at least 50% of mixing time, or the at least one temperature-control means that is set to a temperature, Tz, of 65° C. or higher, or the mixing is carried out in the substantial absence of the one or more rubber chemicals prior to the mixer reaching an indicated temperature. In certain instances, in a single stage or single mixing step the composite can be discharged with a liquid content of no more than 10% by weight. In other embodiments, two or more mixing steps or mixing stages can be performed so long as one of the mixing steps is performed under one or more of the stated conditions.

With multi-stage mixing, as an option, a second or any number of subsequent stages of mixing can improve the compound (or composite) properties compared to a composite mixed with only first stage mixing of the material. Put another way, a composite formed from single stage mixing can be compared to a composite formed from additional stage mixing processes, e.g., subjected to a second stage. When such multi-stage mixing is utilized, one or more of the composite properties (e.g., tan delta and/or modulus ratio) can be improved. The improvement can be a 5%, 10%, or 15% or more improvement in one or more properties as compared to a composite from just the single stage mixing. This improvement can be obtained independent of the type of filler used and independent of the type of elastomers used.

In certain embodiments, the method comprises conducting the mixing at controlled mixer temperatures, e.g., via use of at least one temperature-control means. Controlling mixer temperatures refers to controlling temperatures of at least one surface of the mixer. As an option, mixer temperatures can be controlled during both the charging and at least one of the mixing steps. The temperature-control means can be a temperature-controlling device on and/or within the mixer or otherwise associated with the mixer (e.g., connected to the mixer) that heats or cools at least one surface, and/or one or more parts of the mixer.

The temperature-control means can be, but is not limited to, the flow or circulation of a heat transfer fluid through channels in one or more parts of the mixer. For example, the heat transfer fluid can be water or heat transfer oil. For example, the heat transfer fluid can flow through the rotors, the mixing chamber walls, the ram, and the drop door.

The temperature of the at least one temperature-control means can be set and maintained, as an example, by one or more temperature control units ("TCU"). This set temperature, or TCU temperature, is also referred to herein as "$T_z$." In the case of temperature-control means incorporating heat transfer fluids, $T_z$ is an indication of the temperature of the fluid itself. The heating or cooling provided by the temperature control means, depending on $T_z$, is transferred to at least one surface of the mixer or one or more parts of the mixer; heat is transferred to or from the at least one surface and then to or from the material in the mixer to influence a bulk temperature of the mixture or a portion thereof e.g., local temperature of the mixture.

The mixer can have thermocouples located at different parts of the mixer to provide a more accurate measurement of the temperature of the mixer part(s) or the mixture.

Optimal Tz values can selected based on filler type. For example, for fillers comprising carbon black and silicon-treated carbon black (e.g., at least 50%, at least 75%, at least 90%, or all or substantially all of the filler is carbon black), Tz can have the values described herein e.g., 65° C. or greater or 65° C. to 100° C. When the filler is silica, Tz values can range from 40° C. to 100° C., e.g., from 40° C. to 90° C., from 40° C. to 80°, from 40° C. to 75° C., from 50° C. to 100° C., from 50° C. to 90° C., from 50° C. to 80°, or from 50° C. to 75° C.

Energy applied to the mixture during the mixing step can be controlled through mixer settings and process controls. For example, in a batch mixer, total specific energy takes into account energy applied to the rotor(s) between the charge of solid elastomer and/or wet filler and the discharge per kg of composite on a dry weight basis. For a continuous mixer, total specific energy is the power input per kg of output on a dry weight basis at steady state conditions. For processes that have multiple stage mixing, the total specific energy is the sum of the specific energies from each mixing process. The determination of total specific energy preferably does not include the amount of energy used for shaping or forming the discharged composite (e.g., excludes energy of roll milling of the composite). The resulting "total specific energy," as defined herein is the energy, $E_R$ (e.g., electrical energy) applied to a mixing system that drives the one or more rotors per mass of composite on a dry weight basis. This total specific energy can also be designated at $E_{TOTAL}$. As described herein, the present processes provide a total specific energy under selected operating conditions that balance longer mixing times with evaporation or removal of water in a reasonable amount of time.

As an option, the process comprises, in at least one of the mixing steps, conducting the mixing such that a resulting total specific energy is at least 1,400 kJ or at least 1,500 kJ per kg composite, e.g., at least 1,600 kJ/kg, at least 1,700 kJ/kg, at least 1,800 kJ/kg, at least 1,900 kJ/kg, at least 2,000 kJ/kg, at least 2,500 kJ/kg, or at least 3,000 kJ/kg. As an option, the total specific energy can range from about 1,400 kJ/kg composite or about 1,500 kJ/kg composite (or per kg mixture present in the mixer) to about 10,000 kJ/kg composite (or per kg mixture present in the mixer), such as from 2,000 kJ/kg to about 5,000 kJ or 1,500 kJ/kg to 8,000 kJ/kg, 1,500 kJ/kg to 7,000 kJ/kg, 1,500 kJ/kg to 6,000 kJ/kg, 1,500 kJ/kg to 5,000 kJ/kg, 1,500 kJ/kg to 3,000 kJ/kg, 1,600 kJ/kg to 8,000 kJ/kg, 1,600 kJ/kg to 7,000 kJ/kg, 1,600 kJ/kg to 6,000 kJ/kg, 1,600 kJ/kg to 5,000 kJ/kg, 1,600 kJ/kg to 4,000 kJ/kg, 1,600 kJ/kg to 3,000 kJ/kg, or other values in any of these ranges.

As an option, the process comprises, in at least one of the mixing steps, conducting the mixing such that one or more rotors operate at a tip speed of at least 0.5 m/s for at least 50% of the mixing time or a tip speed of at least 0.6 m/s for at least 50% of the mixing time. The energy inputted into the mixing system is a function, at least in part, of the speed of the at least one rotor and rotor type. Tip speed, which takes into account rotor diameter and rotor speed, can be calculated according to the formula:

$$\text{Tip speed, m/s} = \pi \times (\text{rotor diameter, m}) \times (\text{rotational speed, rpm})/60.$$

As tip speeds can vary over the course of the mixing, as an option, the tip speed of at least 0.5 m/s or at least 0.6 m/s is achieved for at least 50% of the mixing time, e.g., at least 60%, at least 70%, at least 75%, at least 80%, at least 85%, at least 90%, at least 95%, or substantially all of the mixing time. The tip speed can be at least 0.6 m/s, at least 0.7 m/s, at least 0.8 m/s, at least 0.9 m/s, at least 1.0 m/s, at least 1.1 m/s, at least 1.2 m/s, at least 1.5 m/s or at least 2 m/s for at least 50% of the mixing time, or other portions of the mixing listed above. The tip speeds can be selected to minimize the mixing time, or from 0.6 m/s to 10 m/s, from 0.6 m/s to 8 m/s, from 0.6 to 6 m/s, from 0.6 m/s to 4 m/s, from 0.6 m/s to 3 m/s, from 0.6 m/s to 2 m/s, from 0.7 m/s to 4 m/s, from 0.7 m/s to 3 m/s, from 0.7 m/s to 2 m/s, from 0.7 m/s to 10 m/s, (e.g., for at least 50% of the mixing time or other mixing times described herein). In the alternative or in addition, the tip speeds can be selected to maximize throughput.

The wet-mixed composite can be discharged from the mixer with the filler dispersed in the elastomer at a loading of at least 20 phr with a filler yield loss of no more than 10%, and a liquid content of no more than 10% by weight of total composite. Discharging, ("dumping" in batch mixing), can occur on the basis of time or temperature or specific energy or power parameters selected to minimize rubber degradation. In one embodiment, the mixing time can be determined from the period that charging has been completed to the time of discharge. For batch internal mixers, mixing time can be determined from the ram down time, the time that the ram is operated at a lowermost position and is fully closed. In other embodiments, the lowermost position of the ram (i.e., its fully seated position) can allow a certain amount of ram deflection. The mixing time does not encompass the time periods when charging additional components, such as the charging of one or more additional portions of elastomer and/or filler. As an option, for continuous mixers a nominal mixing time (or residence time) can be calculated from the mixer chamber volume and the volumetric production rate.

As an option, discharging occurs on the basis of a defined mixing time. The mixing time between the start of the mixing and discharging can be about 1 minute or more, such as from about 1 minute to 40 minutes, from about 1 minute to 30 minutes, from about 1 minute to 20 minutes, or from 1 minute to 15 minutes, or from 5 minutes to 30 minutes, or from 5 minutes to 20 minutes, or from 5 minutes to 15 minutes, or from 1 minute to 12 minutes, or from 1 minute to 10 minutes, or from 3 minutes to 30 minutes, or other times. Alternatively, for batch internal mixers, ram down time can be used as a parameter to monitor time for batch mixing times. For example, the ram down time can range from 3 minutes to 30 minutes, from 3 minutes to 20 minutes, from 3 minutes to 10 minutes, from 5 minutes to 30 minutes, from 5 minutes to 20 minutes, from 5 minutes to 10 minutes.

As an option, discharging occurs on the basis of dump or discharge temperature. For example, the mixer can have a dump temperature ranging from 120° C. to 180° C., 120° C. to 190° C., 130° C. to 180° C., such as from 140° C. to 180° C., from 150° C. to 180° C., from 130° C. to 170° C., from 140° C. to 170° C., from 150° C. to 170° C., or other temperatures within or outside of these ranges.

The discharged composite can have a liquid content of no more than 10% by weight based on the total weight of the composite, as outlined in the following equation:

Liquid content of composite %=100*[mass of liquid]/[mass of liquid+mass of dry composite]

The discharged wet-mixed composite can have a liquid content of no more than 10% by weight based on total weight of the composite, such as no more than 9 wt %, no more than 8 wt %, no more than 7 wt %, no more than 6 wt %, no more than 5 wt %, no more than 2 wt %, or no more than 1 wt %, based on the total weight of the composite. This amount can range from about 0.1 wt % to 10 wt % or from about 0.5 wt % to 9 wt % or from about 0.5 wt % to about 7 wt %, based on the total weight of the composite discharged from the mixer at the end of the process. The liquid content (or "moisture content") can be the measured weight % of liquid present in the composite based on the total weight of the composite. There optionally may be additional liquid present in the mixer which is not held in the composite that is discharged. This excess liquid is not part of any liquid content calculated for the composite.

The filler yield loss is determined based on the theoretical maximum phr of filler in the elastomer (assuming all filler charged to the mixer is incorporated into the composite) minus the measured phr of filler in the composite discharged. Loose filler present on the surface of the composite due to poor incorporation of the filler into the elastomer is included in the filler yield loss. This measured amount can be obtained from thermogravimetric analysis (TGA). Thus, filler yield loss (%) is calculated as:

[((Theoretical phr filler)−(measured phr filler))/ ((Theoretical phr filler))]×100

As an option, a fill factor of the wet filler and solid elastomer (on a dry weight basis) comprising natural rubber can be no more than 70% or no more than 68%, e.g., ranging from 60% to 70%, from 60% to 68%, or from 65% to 68%. Such conditions can be used for solid elastomer comprising at least 50%, at least 75%, at least 90%, or at least 95% natural rubber, e.g., a blend of natural rubber and at least one additional elastomer, such as polybutadiene and/or styrene-butadiene rubber, or other elastomers as disclosed herein.

As an option, the rate of liquid release, including, but not necessarily limited to, rate of evaporation of the liquid from the composite during the mixing, can be measured as a time average release rate of the liquid per kg of composite, and this rate can be from 0.01 to 0.14 kg/(min·kg) or from 0.01 to 0.07 kg/(min·kg) or other rates below or above this range. This release rate can be the overall release rate of liquid removal by any means during mixing or can be the release rate by evaporation only. In the case of an aqueous liquid, the evaporation rate can be considered a steam release or steam evolution rate. A release rate of less than 0.01 kg/(min·kg) may generally reflect a longer time period to remove liquid, e.g., at $T_z$ less than 65° C. and/or specific energy levels less than 1,500 kJ/kg, and/or tip speed less than 0.5 m/s or less than 0.6 m/s. Release rates greater than 0.15 kg/(min·kg) can reflect shorter mixing times. A non-optimized time average release rate can result in poor dispersion and rubber properties.

As an option, maximum pressure can be controlled. If the mixer is a batch mixer with a ram, the pressure inside the mixer chamber can be influenced by controlling the pressure applied to the ram cylinder.

As an option, multi-stage mixing processes can be used to make the wet-mixed composite, with at least two mixing steps or stages. These two (or more) mixing steps can be considered multi-step or multi-stage mixing with a first mixing step or stage and at least a second mixing step or stage. One or more of the multi-stage mixing processes can be batch, continuous, semi-continuous, and combinations thereof.

For the multi-stage process, the methods for preparing the composite include the step of charging or introducing into a first mixer at least a) one or more solid elastomers and b) one or more fillers wherein at least one fillers or a portion of at least one filler is wet filler as described herein (e.g. a wet filler that comprises a filler and a liquid present in an amount of at least 15% by weight based on the total weight of the wet filler), by any of the methods described herein. The combining of the solid elastomer with wet filler forms a mixture or composite during this mixing step(s), which can be considered as a first mixing step or stage. The method further includes mixing the mixture, in this first mixing step, to an extent that at least a portion of the liquid is removed by evaporation or an evaporation process that occurs during the mixing. This first mixing step (in one or more mixing steps) or stage is conducted using one or more of the processes described earlier that forms a composite with the understanding that, after completion of the first mixing, it is not necessary for the mixture discharged from the mixer after the first mixing step (e.g., a discharged mixture) to have a liquid content of no more than 10 wt %. In other words, with the multi-stage process(es), the mixture resulting from the completion of the first mixing from the first mixer (or first mixing step) can have a liquid content above 10 wt %, but does have a liquid content that is reduced (by wt %) as compared to the liquid content of the combined solid elastomer and wet filler at the start of the first mixing step, e.g., reduced to an amount less than the liquid content at the beginning of any subsequent mixing step, e.g., reduced by at least 50% by weight.

The method then includes mixing or further mixing the mixture in at least a second mixing step or stage utilizing the same mixer (i.e., the first mixer) and/or utilizing a second mixer(s) that is different from the first mixer.

After the first mixing, the further mixing step(s) conducted for the multi-stage mixing can utilize any one or more of the mixing procedures or parameters or steps utilized in the first mixing step as described herein. Thus, in conducting the further mixing step or stage, the same or different mixer design and/or same or different operating parameters as for the first mixer can be used in the further mixing stage. The mixers and their options described earlier for the first mixing step and/or the operating parameters described earlier for the mixing step can be optionally used in the further or second mixing step (e.g. the mixing steps, as described herein, that include a tip speed of at least 0.5 m/s for at least 50% of the time or at least 0.6 m/s for at least 50% of the time, and/or $T_z$ 50° C. or higher, 60° C. or higher, or 65° C. or higher. Thus, methods of preparing a composite in a multi-stage mixing, wherein one or more of the following parameters can be utilized in at least one of the mixing steps, at least two of the mixing steps, or all of the mixing steps:

the at least one temperature-control means is set to a temperature, Tz, of 65° C. or higher during said mixing; and/or during said mixing, the one or more rotors operate, for at least 50% the mixing time, at a tip speed of at least 0.5 m/s, conducting the mixing such that a resulting total specific energy is at least 1500 kJ/kg composite; and/or optionally adding at least one additive selected from antidegradants and coupling agents during said charging (a) or said mixing (b), and optionally adding one or more rubber chemicals after the mixer reaches a temperature of 120° C. or higher; and/or said charging (a) and said mixing (b) prior to the mixer reaching the indicated temperature are carried out in the substantial absence of the one or more rubber chemicals; and/or the mixer has a fill factor, and the fill factor, on a dry weight basis, of the at least solid elastomer and the wet filler is no more than 72%.

During mixing in the second mixer, the ram pressure can be alleviated, which can occur, e.g., under one or more of the following conditions:

(i) The ram can be seated but essentially no pressure is applied to the ram, e.g., a pressure of 5 psi or less.

(ii) The ram is raised to at least 75% of its highest level. Some mixers allow the ram to be positioned at certain heights. A ram in the fully seated position is at 0% of its highest level in contrast to the ram being raised to its highest level or the fully open position, which is the typical position of the ram when material is charged into the mixer. A ram positioned at a height of at least 75% of its highest level is e.g., at least 80%, at least 85%, at least 90%, at least 95%, or fully raised to its highest level (100%), ensures minimal contact between the ram and the elastomer charged to the mixer.

(iii) When pressure is not applied to the mixing chamber, certain rams can operate as a floating weight, e.g., floating mode. While the ram may contact the elastomer, the pressure applied is minimal.

(iv) A ram is positioned such that it does not substantially contact the mixture. If the contents have a low fill factor, e.g., as low as 25%, then positioning the ram height to at least 75% of its highest level may not be necessary. The ram can be positioned at a height such that it does not substantially contact the mixture, e.g., no more than 10% of the surface of the ram (by area) contacts the mixture, e.g., no more than 5% of the surface of the ram, or 0% of the surface of the ram does not contact the mixture.

(v) Selected a mixer not equipped with a ram.

(vi) A fill factor of the mixture, on a dry weight basis, ranges from 25% to 70%, e.g., from 25% to 60%, from 25% to 55%, from 25% to 50%, from 25% to 45%, from 25% to 40%, from 30% to 70%, from 30% to 60%, from 30% to 55%, from 30% to 50%, from 30% to 45%, from 30% to 40%, from 35% to 70%, from 35% to 60%, from 35% to 55%, from 35% to 50%, from 35% to 45%, or from 35% to 40%. By controlling the fill factor, it may not be necessary to manipulate ram operation or position.

As an option, after the composite is discharged from the second mixer, the composite can be subjected to additional mastication, e.g., by mixing in either the first or second mixer, or a third mixer.

Tires, Treads and Compounds

The treads and tires can be compounded, built, shaped, molded and cured by various methods which will be readily apparent to those having skill in such art.

Tire treads of the invention can comprise one or more rubber compounds extruded into one or more superimposed, elastomeric layers such as inner layer or underlayer between a tire carcass, or belt, and an outer layer or cap that contacts the road surface. One or more additional layers or zoned layers superimposed inside the cap or an inner layer may be employed. Alternately, tire treads of the invention can comprise multi-zoned elastomeric layers. For example, axial zones across the tire tread may be fabricated with one rubber compound in an equatorial plane and one or more different rubber compound(s) in lateral, outer planes Similar zoned constructions may be employed in one or more tread inner layers. The volume of voids (grooves or sipes) may vary across a multi-zone construction, without or without selection of different rubber compounds in such zones. Thickness of elastomeric layers can be varied. Composites of the invention can be used in rubber compounds for outer layers of the tread and for equatorial plane zones of a multi-zone tread to improve wear resistance and rubber performance in areas of maximum stress during operation of the tire without generating excessive heat build-up.

Additionally, tires and tire treads of the invention may comprise rubber compounds made with the composites in shoulder areas of the inner tread and carcass construction where mechanical stresses tend to be high, particularly in trucks and heavy vehicles. A zone or bead of such rubber compounds can be used in a multi-zone inner layer design, together with, e.g., very low tan delta, superior low heat buildup rubber compounds in lower mechanical stress portions of the inner layers of the tread. Use of the invention in such shoulder areas also facilitates re-treading, thus extending useful tire life for truck and other heavy vehicle tires.

The rubber compounds of treads and tires according to the invention can comprise, in addition to the composite of the invention, e.g., plasticizers, including processing oil and resins, pigments, antioxidants, anti-ozone waxes, a cross-linking system based either on sulphur and/or on peroxide and/or on bismaleimides, cross-linking activators comprising zinc monoxide and stearic acid, extender oils, one or more agents for covering the silica, such as alkoxysilanes, polyols or amines.

It is readily understood by those having skill in the pertinent art that the rubber composition (e.g., those made from the composites of the invention) would be compounded by methods generally known in the rubber compounding art, such as mixing sulfur-vulcanizable constituent rubbers with various commonly used rubber additives, e.g., curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as reinforcing particles, fibers, granules and platelets, e.g., carbon black and silica and combinations thereof. As known to those skilled in the art, depending on the intended use of the sulfur vulcanizable and sulfur vulcanized material (rubbers), the additives mentioned above are selected and commonly used in effective amounts and incorporated into compounds at optimized stages of mixing processes.

The rubber compounds can be extended using paraffinic, aromatic or naphthenic oil, with a quantity of extender oil of between 0 and 50 phr. As an option enabled by the composite of the invention, extender oil and resin may be used at lower amounts, such as 5 phr or less, or 2 phr or less, of the rubber compound to yield better mechanical properties and abrasion resistance in the rubber compound and tire tread, and improve processability of a compound having very low levels of oil or resin.

When used in a compound, fatty acids, e.g., stearic acid, can be added in amounts of about 0.5 to about 3 phr. Typical amounts of zinc oxide can be about 1 to about 5 phr. Typical amounts of waxes can be about 1 to about 5 phr. Microcrystalline waxes can be used. Typical amounts of peptizers can be about 0.1 to about 1 phr. Typical peptizers can be, e.g., pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, e.g., an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5 phr, sometimes from about 2 to about 2.5 phr, being preferred.

Accelerators are used to control the time and/or temperature required for vulcanization and to improve the properties of the vulcanizate. In one embodiment, a single accelerator system may be used, i.e., primary accelerator. A primary accelerator(s) can be used in total amounts ranging from about 0.5 to about 4 phr, preferably about 0.8 to about 2.5, phr. In another embodiment, combinations of a primary and a secondary accelerator can be used with the secondary accelerator being used in smaller amounts (of about 0.05 to about 3 phr) in order to activate and to improve the properties of the vulcanizate. Combinations of these accelerators might be expected to produce a synergistic effect on the final properties and can be somewhat better than those produced by use of either accelerator alone. In addition, delayed action accelerators can be used which are not affected by normal processing temperatures but produce a satisfactory cure at ordinary vulcanization temperatures. Vulcanization retarders can also be used.

Suitable types of accelerators that can be used are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

In practice, the tread rubber composition can be prepared, e.g., in at least one non-productive mixing step in an internal rubber mixer, often a sequential series of at least one, usually two, separate and individual preparatory internal rubber mixing steps, or stages, in which the composite is first mixed with any additional filler or elastomer or other additives ("smalls"), followed by a final mixing step ("productive" mixing step) in an internal rubber mixer, or optionally on an open mill mixer, where curatives (sulfur and sulfur vulcanization accelerators) are blended at a lower temperature and for a substantially shorter period of time.

Typically after each internal rubber mixing step the rubber mixture (composition) is removed from the rubber mixer and cooled to a temperature below 40° C., e.g., to a temperature in a range of about 20° C. to about 40° C., and then added back to an internal rubber mixer for the next sequential mixing step, or stage. Such temperature choices and handling techniques in non-productive mixing stages, followed by a productive mixing stage, are well known by those having skill in such art.

The mixing of a final rubber composition can be accomplished by such a sequential mixing process. The ingredients can be mixed in at least two stages, namely, at least one "non-productive" or preparatory stage followed by a productive mix stage. The final curatives are typically mixed in the productive or final mix stage in which the mixing typically occurs at a temperature (maximum or ultimate temperature) lower than the mix temperature(s) of the preceding non-productive mix step(s).

The forming of a tire tread or other component is contemplated to be by conventional means such as, e.g., by extrusion or calendering or molding, of a rubber composition to provide a shaped, unvulcanized rubber article or component such as a tire tread layer, or a complete tread ready for assembly. Such forming and fabricating operations are well known to those having skill in such art.

It is understood that the tire, as a manufactured article, is prepared by shaping and curing the assembly of its components at an elevated temperature (e.g., 140° C. to 170° C.) and elevated pressure in a suitable mold.

In general, and for any of the tire treads described herein, a tire including one of tire treads is another aspect of the present invention.

The tire and the tire tread can be fitted to vehicles such as, but not limited to, vehicles carrying heavy loads and driving at sustained speeds, such as trucks, tractors, trailers or buses.

For example, the tire of the invention can be a pneumatic tire having radial carcass reinforcement and tread with additional layers or zones of elastomeric materials (i.e., rubber compounds), intended to be fitted to vehicles carrying heavy loads and driving at sustained speeds, such as trucks, tractors, trailers or buses.

Alternatively, the tire and the tire tread can be fitted to vehicles such as light trucks, passenger cars, performance vehicles, motorcycles, off-the-road vehicles, heavy equipment vehicles, aircraft and other vehicles, including vehicles fitted with tracks having rubber treads mounted on the tracks.

Specific examples of tires and fillers, elastomers, and/or other parameters of the present invention include the following.

The tire can be an off-the-road or heavy equipment vehicle tire, and the tread comprises 60-100 phr elastomer, comprising at least one natural or synthetic polyisoprene, and at least 40 phr filler comprising at least one carbon black having a BET of at least 130 m$^2$/g and an COAN of no greater than 115 ml/g.

The tire can be an off-the-road or heavy equipment vehicle tire, and the tread further comprises at least one styrene butadiene copolymer, or butadiene polymer, or a combination thereof.

The tire can be an off-the-road or heavy equipment vehicle tire, and the tread comprises 60-100 phr elastomer, comprising at least one natural or synthetic polyisoprene, and at least 40 phr filler comprising at least one carbon black, having a BET of at least 130 m$^2$/g and an COAN of no greater than 115 ml/g, and 5-10 phr of at least one silica. For instance, the tire can be an off-the-road or heavy equipment vehicle tire, and the tread further comprises at least one carbon black having a BET greater than 150 m$^2$/g, an OAN less than 100 ml/g, and a COAN less than 90 ml/g.

The tire can be a performance vehicle or motorcycle tire, and the tread comprises 100 phr elastomer, comprising at least one polymer selected from solution styrene butadiene copolymer and butadiene polymer and combinations thereof, and at least 40 phr filler comprising at least one carbon black having a STSA of 150 to 220 m$^2$/g and at least one silica having a BET of 150 to 200 m$^2$/g.

The tire can be a truck or bus tire, and the tread comprises 60-100 phr of at least one natural or synthetic polyisoprene elastomer and at least 30 phr filler comprising at least one carbon black having a STSA of at least 115 m$^2$/g and an COAN of less than 110 ml/g, and 1-25 phr of at least one silica filler.

The tire can be a truck or bus tire, and the tread comprises 60-100 phr of at least one natural or synthetic polyisoprene elastomer and 45-60 phr filler comprising at least one carbon black having a STSA of at least 115 m$^2$/g and an COAN of less than 110 ml/g, and 1-25 phr of at least one silica filler.

The tire can be a truck or bus tire, and the tread comprises 60-100 phr of at least one natural or synthetic polyisoprene elastomer and at least 30 phr filler comprising at least one carbon black having a BET greater than 150 m$^2$/g, an OAN less than 100 ml/g, and a COAN less than 90 ml/g and 1-25 phr of at least one silica filler.

The tire can be a truck or bus tire, and a shoulder component of the tread comprises 60-100 phr of at least one natural or synthetic polyisoprene elastomer and at least 40 phr filler comprising at least one carbon black having a BET of at least 120 m$^2$/g and an COAN of less than 110 ml/g, and 1-20 phr of at least one silica filler.

The tire can be a truck or bus tire, and a shoulder component of the tread comprises 60-100 phr of at least one natural or synthetic polyisoprene elastomer and at least 40 phr filler comprising at least one carbon black having a BET greater than 150 m$^2$/g, an OAN less than 100 ml/g, and a COAN less than 90 ml/g and 1-25 phr of at least one silica filler.

The tire can be an underlayer of the tread comprises 60-100 phr of at least one natural or synthetic polyisoprene elastomer, polybutadiene elastomer, or a combination thereof, and at least 40 phr filler comprising at least one carbon black having a BET of less than 100 m$^2$/g and an 12 number of less than 110 g/kg.

The tire can be a tire with a tire tread that comprises at least 20 phr filler comprising at least one carbon black selected from surface modified carbon black, oxidized carbon black, multi-phase aggregate carbon black (e.g., ECO-BLACK™ material) and carbon black having surface hydrogen content of at least 2000 ppm.

As an option, the wet-mixed composites can be used in or produced for use (e.g., to form a vulcanizate to be incorporated) in various parts of a tire other than the tire tread, for example, base, undertread, innerliners, tire sidewalls, tire sidewall inserts, wire-skim for tires, and cushion gum for retread tires, in pneumatic tires as well as non-pneumatic or solid tires.

In some embodiments, the composites and formulations described herein are used in or produced for use (e.g., to form a vulcanizate to be incorporated) in various tire designs, such as those described in U.S. Pat. Nos. 3,157,218; 6,247,512; 8,936,056; 9,713,943; 10,308,073; 6,540,858; 9,649,883; 8,302,643; 9,713,942; 8,720,508; 8,939,183; 9,387,728; 9,783,004; 10,245,891; 10,336,140; 7,028,734; 7,735,533; 8,695,662; 8,936,056; 10,399,386; 10,543,718; US Published Patent Application Nos. 2019/0351716 and 2020/0070577; and WO 2018/122496A1; WO 2014/102136A1; WO 2019/092361A1; and WO 2019/122618A1, all incorporated in their entirety by reference herein.

With respect to the present invention, any 'option' or 'optional feature' is combinable with other optional features. The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

The entire contents of all cited references in this disclosure, to the extent that they are not inconsistent with the present disclosure, are incorporated herein by reference.

The present invention can include any combination of the various features or embodiments described above and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

EXAMPLES

The Examples describe the preparation of wet-mixed composites (masterbatches), compounds prepared from the masterbatches, and corresponding vulcanized tire treads of the invention (Sample E1, E3), and comparative materials (Samples C1 and C2).

Examples 1-3

Preparation of Sample E1 Wet-Mixed Composite

For the wet-mixed composite used to prepare rubber compounds for tire treads of the invention (sample E1) wet carbon black was obtained by jet milling N234 carbon black pellets (Vulcan® 7H carbon black obtained from Cabot Corporation) and re-pelletizing and wetting the dry, milled carbon black with reverse osmosis (RO) treated water in a pin pelletizer. The water content of the wet carbon black was in the range of 54-60%, by weight of wet carbon black.

Mixing of the wet-mixed composite using the wet carbon black and the solid natural rubber was performed in a two-stage mixing process at a targeted filler loading of 51 phr. First stage mixing to form the composite was done in a Kobelco BB-72 Tangential Mixer fitted with 4WN rotors, with a net capacity of 66.2 L, according to the mixing protocol in Table 1A. The resulting mixture was transferred into a TSR-125 Twin-Screw Dump Extruder fitted with stationary knives (Kobelco Kobe Steel Group) for further processing and discharged into a second mixer for a second stage of mixing. The second stage of mixing was done in a Kobelco BB-16 Tangential Mixer fitted with 6WI rotors (14.4 L capacity), according to the mixing protocol in Table 1B, wherein mastication and evaporation of water were completed to yield the composite, employing an automatic control unit to maintain temperature of the mixture (at a set-point of 135° C.) by varying mixer rpm. The resulting mixture was transferred into a Twin Screw Dump Extruder fitted with a Roller Die (Kobelco Kobe Steel Group) for conversion into sheets of composite. A standard grade RSS3 natural rubber (Von Bundit Co., Thailand) was used, and an anti-degradant (2 phr 6PPD) was added during the first stage of mixing.

TABLE 1A

Wet-Mixed Composite - E1 Sample First Stage Process

| Mixing Steps Description | Mixer rpm |
|---|---|
| Add rubber to BB-72 Mixer | 45 |
| Masticate rubber to earlier of 120 s or 110° C. | 45 |
| Add ½ filler over 20 s | 60 |
| Mix to earlier of 120 s or 130° C. | 80 |
| Add ¼ filler over 20 s | 60 |
| Mix to earlier of 120 s or 130° C. | 80 |
| Add ¼ filler over 20 s and mix with ram down for additional 20 s | 60 |
| Mix to 155° C. | 80 |
| Add 6PPD over 20 s | 60 |
| Mix until target dump temperature of 175° C. | 80 |

TABLE 1B

Wet-Mixed Composite - E1 Sample Second Stage Process

| Mixing Steps Description | Mixer rpm |
|---|---|
| Add First Stage composite to BB-16 Tangential Mixer over 20-35 s | 35 |
| Masticate with ram raised for 90 s | 35 |
| Masticate with ram raised under automatic temperature control at 135° C.; Mix for 390 s | Variable: 35-50 |

Preparation of Sample C2 Dry Mix Composite

Mixing and compounding of comparative dry mix composite and compound was performed as described below in Tables 2 and 4-5. Rubber used was standard grade RSS3 natural rubber (Von Bundit Co., Thailand), unless otherwise indicated.

Preparation of Sample C1 Solid Elastomer Masterbatch

The C1 comparative solid elastomer masterbatch sample was prepared by the liquid masterbatch process of U.S. Pat. No. 8,586,651, Example 2, except as noted below.

The elastomer latex (diluted and de-sludged MVL Field Latex) had a dry rubber content of 28 wt % and the filler slurry contained 13-14 wt % carbon black (Vulcan® 7H carbon black (N234 grade) obtained from Cabot Corporation, Boston, MA). Flow rates were adjusted to yield a target, final carbon black loading of 50 phr at the desired production rate. The average carbon black loading level of the resulting composite was 50.8 phr. The dewatered composite was masticated, mixed with 2 phr antioxidant (6PPD) and dried in a continuous compounder (Farrel Unimix Continuous Mixer (FCM), equipped with two #15 rotors; operated at 190-320 rpm, Farrel Corporation, Ansonia, CT) and further masticated, cooled and dried on an open mill.

The resulting solid elastomer masterbatch composite was compounded according to the formulation in Table 3 and the processes outlined in Tables 2 and 4.

Compound Preparation

All compound mixing processes were performed as described in Tables 2 and 4-5 below. A 320 Liter intermeshing mixer (Harburg Feudenberger GK 320) and a 55 Liter intermeshing mixer (Carter 55 L Intermeshing with Interswirl rotors) were used for mixing the composite and compound batches. The first stage mixing of comparative examples C1 and C2 was accomplished using the 320 L mixer and the down-stream mixing operation was done using the 55 L mixer. All stages of mixing for sample E1 of the invention were conducted using the 55 L mixer. Mixing stages were selected to achieve desired Mooney viscosity values ranging from 6565 to 80 MU (ML(1+4) at 100° C.) in the final compounds.

First Stage mixing of compounds (C1, E1 and C2 samples) was conducted as set forth in Table 2.

TABLE 2

First Stage Compound Mixing

| Description | C1 50 phr | E1 50 phr | C2 50 phr |
|---|---|---|---|
| Mixer size (L) | 320 | 55 | 320 |
| Fill factor % | 60 | 70 | 60 |
| TCU ° C. | 40 | 40 | 40 |
| Rotor Speed rpm | 25 | 30 | 35 |
| Ram Pressure bar | 7.0 | 5.5 | 7.0 |
| Time (s) | | | |
| Add Composite/Elastomer | 0 s | 0 s | 0 s |
| Add ⅔ CB Sweep, Add ⅓ CB | | | 30 s 120 s |
| Add Smalls | 30 s | 30 | 180 s |
| Sweep | 90 s | 90 s | 240 s |
| Dump (temperature) | 180 s (not exceed 130° C.) | 180 s (not exceed 140° C.) | 300 s (not exceed 160° C.) |

Water content in the discharged composite prior to curing was measured using a moisture balance (Model: HE53, Manufacturer: Mettler Toledo NA, Ohio). The composite was sliced into small pieces (size: length, width, height<5 mm) and 2 to 2.5 g of material was placed on a disposable aluminum disc/plate which was placed inside the moisture balance. Weight loss was recorded for 30 mins at 125° C. At the end of 30 mins, moisture content for the composite was recorded as:

$$\text{moisture content of composite} = \left(\frac{\text{initial weight} - \text{final weight}}{\text{initial weight}}\right) * 100.$$

The carbon black loading in the composite was determined by Thermogravimetric Analysis (Model Q500 unit, Manufacturer: TA Instruments, DE). About 15-20 mg of rubber samples were used. Samples were first heated up under nitrogen atmosphere from room temperature to 125° C. at 30° C./min and isothermal for 30 min to remove moisture, then heated up to 550° C. at 30° C./min and isothermal for 5 min to determine rubber content. After that the atmosphere was switched to air, samples were then heated up to 800° C. at 30° C./min and isothermal for 15 min to determine carbon black (CB) content and other residues. The CB loadings were then calculated based on the rubber and CB content data.

The following tests were used to obtain rubber properties for each of the vulcanized tire treads:

Tensile stress at 100% elongation (M100) and tensile stress at 300% elongation (M300) were evaluated by ASTM D412 at 23° C. (RT), 50% relative humidity. Tan delta was measured by a dynamic mechanical analysis temperature sweep in tension mode under 0.5% strain at 10 Hz, with pre-tension of 0.5 N. Results are reported at a temperature of 60° C.

Tread Compounding Procedures

Final compounds were made according to the formulations in Table 3. These formulations were mixed as set forth in Tables 2 and 4.

To convert C2 dry mix composite to compound and vulcanized tire tread, at least one additional mixing stage was carried out as described in Table 5.

Components used in all formulations included carbon black filler (Vulcan® 7H (N234) carbon black obtained from Cabot Corporation), antioxidants 6PPD [N-(1,3-dimethylbutyl)-N'-phenyl-p-phenylenediamine] and TMQ, standard rubber grades of zinc oxide, stearic acid and sulfur, and TBBS accelerator, all obtained from Akrochem, Akron, Ohio. The solid dry RSS3 natural rubber had a moisture content of <1 wt %.

TABLE 3

Compound Formulation for Tire Treads

| Component (phr on a dry weight basis) | C1, E1, C2 |
|---|---|
| NR/Carbon Black Composite | 100/50 |
| 6PPD | 2.5 |
| TMQ | 1.5 |
| Zinc Oxide | 3.0 |
| Stearic Acid | 2.0 |
| Wax beads | 1.5 |
| TBBS | 1.4 |
| Sulfur | 1.2 |

TABLE 4

Stage 2 Compound Mixing

| Description | C1 50 phr | E1 50 phr | C2 50 phr |
|---|---|---|---|
| Mixer size | 55 | 55 | 55 |
| Fill factor % | 68 | 68 | 70 |
| TCU ° C. | 30 | 30 | 40 |
| Rotor Speed rpm | 25 | 25 | 30 |
| Ram Pressure bar | 3.4 | 3.4 | 5.5 |
| Time (s) | | | |
| Add Composite | 0 s | 0 s | 0 s |
| Add Curatives | 0 s | 0 s | — |

TABLE 4-continued

Stage 2 Compound Mixing

| Description | C1 50 phr | E1 50 phr | C2 50 phr |
|---|---|---|---|
| Sweep | 45 s | 45 s | — |
| Dump | 90 s | 90 s | 180 s |
| Final Mooney Viscosity | 67 | 74 | |

TABLE 5

Stage 3-4 Mixing: C2 Dry Mix

| Description | Dry Mix 50 phr Stage 3 | Dry Mix 50 phr Stage 4 |
|---|---|---|
| Mixer size (L) | 55 | 55 |
| Fill factor % | 70 | 68 |
| TCU ° C. | 40 | 30 |
| Rotor Speed rpm | 30 | 25 |
| Ram Pressure bar | 5.5 | 3.4 |
| Time (s) | | |
| Add Composite | 0 s | 0 s |
| Add Curatives | — | 0 s |
| Sweep | — | 45 s |
| Dump | 180 s | 90 s |
| Final Mooney Viscosity | — | 73 |

Tires Made with Tread Compounds C1, E1 & C2

The manufacture of tires made with tread compounds of the invention and comparative compounds was carried out by known processes.

An ORBITREAD® re-treading device (McNeil & NRM, Inc., Akron, Ohio) and process was used to build the tires (tire size: 195/55R15). Tires were built and cured by standard techniques known in the art including the following steps: (1) new commercial tires were buffed to remove the tread compound; (2) rubber compound was extruded and applied to the buffed tires; (3) tires with the applied strip were cured using pre-determined cure conditions (cure time) at 150° C., based on cure curves, thermocouple measurements of the tire temperature profile, and modeling of the tire cure behavior.

Table 6 sets forth tested properties of experimental C1, E1 and C2 cured tire treads, together with the same properties measured on a series of 32 comparative commercial tire treads designed for heavy vehicles, such as trucks, which contain natural rubber and carbon black as the sole rubber and reinforcing filler, respectively.

TABLE 6

Tire Tread Properties

| | NR/Carbon Black phr | Tangent Delta @60 C. | % Elongation @ Break, RT | M300/M100, RT |
|---|---|---|---|---|
| Tire Treads C1, E1, C2 | | | | |
| C1 | 50 | 0.09 | 490 | 6.00 |
| E1 | 50 | 0.10 | 490 | 5.73 |
| C2 | 50 | 0.14 | 530 | 5.43 |

TABLE 6-continued

Tire Tread Properties

| Commercial Tire Tread | NR/Carbon Black phr | Tangent Delta @60 C. | % Elongation @ Break, RT | M300/M100, RT |
|---|---|---|---|---|
| 1 | 49 | 0.09 | 430 | 5.07 |
| 2 | 54 | 0.08 | 410 | 5.44 |
| 3 | 51 | 0.09 | 430 | 5.42 |
| 4 | 52 | 0.09 | 380 | 4.93 |
| 5 | 52 | 0.08 | 480 | 5.07 |
| 6 | 50 | 0.08 | 450 | 5.94 |
| 7 | 50 | 0.10 | 390 | 4.67 |
| 8 | 46 | 0.08 | 470 | 6.09 |
| 9 | 50 | 0.11 | 460 | 5.31 |
| 10 | 51 | 0.10 | 390 | 5.10 |
| 11 | 55 | 0.13 | 400 | 5.10 |
| 12 | 51 | 0.09 | 400 | 5.10 |
| 13 | 48 | 0.10 | 530 | 5.26 |
| 14 | 47 | 0.05 | 441 | 4.87 |
| 15 | 56 | 0.13 | 450 | 5.57 |
| 16 | 49 | 0.07 | 430 | 5.54 |
| 17 | 47 | 0.10 | 460 | 5.17 |
| 18 | 52 | 0.10 | 400 | 4.88 |
| 19 | 50 | 0.09 | 500 | 5.55 |
| 20 | 45 | 0.10 | 520 | 5.49 |
| 21 | 54 | 0.10 | 430 | 5.51 |
| 22 | 46 | 0.07 | 440 | 5.40 |
| 23 | 51 | 0.11 | 470 | 6.09 |
| 24 | 50 | 0.09 | 460 | 5.71 |
| 25 | 53 | 0.07 | 400 | 5.22 |
| 26 | 47 | 0.06 | 380 | 5.25 |
| 27 | 49 | 0.10 | 450 | 5.39 |
| 28 | 55 | 0.10 | 430 | 5.42 |
| 29 | 51 | 0.07 | 400 | 5.69 |
| 30 | 55 | 0.08 | 380 | 5.52 |
| 31 | 53 | 0.09 | 400 | 5.52 |
| 32 | 51 | 0.1 | 470 | 5.49 |

Data of Table 6 demonstrate that tire tread compounds containing natural rubber and wet carbon black according to the invention have: (a) higher tensile stress ratio (M300/M100), and (b) lower tan δ values than the comparative example C2 prepared by a conventional dry mix process; and (a) equivalent elongation at break and (b) M300/M100 values close to those of comparative example C1 prepared by a liquid masterbatch process, while having significant wet-mixed composite processing advantages achieved by eliminating liquid masterbatch complexities and constraints.

Data in Table 6 further demonstrate that tire tread of the invention has a combination of: (a) higher elongation at break and, in all but two instances, higher tensile stress ratio (M300/M100); and (b) lower, or comparable, tan δ values relative to a broad range of commercial truck tire tread compounds made from natural rubber/carbon black formulations at similar filler loading levels with comparable reinforcing grades of carbon black filler.

Example 4

Filler Dispersion in Tread Compounds

The quality of carbon black filler dispersion in tire treads made with compounds of Examples 1-3, together with samples of commercial truck tire treads comprising comparable rubber formulations were measured by the following method. Macrodispersion for the vulcanized compounds is indicated by V, the area percentage of undispersed carbon black particles larger than 10 μm determined by optical microscopy in transmission mode, in the tread samples.

Macrodispersion Test Method:

Macrodispersion characteristics were determined by optical microscopy in transmission mode. Cryo-microtome slices (1 μm thickness) of a rubber sample were cut with a diamond knife on a PTPC PowerTome ultramicrotome instrument (RMC Boeckeler). The slices were laid on a glass slide for transmission optical imaging at a resolution of 0.65 μm/pixel with a field of view of 0.55 mm². At least 10 optical images were acquired for each sample with each image taken from a different slice of the same sample. The images were processed by first correcting the uneven background of the image with a pseudo flat-field correction based on Gaussian blur. The image noise is reduced using an edge-preserving bilateral filter and the image contrast enhancement is applied when needed. The dark objects and bright objects in the image represented undispersed particles and voids, respectively, while the gray image background represented regions of rubber with well dispersed carbon black. The objects were separated from the image with segmentation of the image by using a suitable global or local thresholding method, which created two binary images representing the undispersed particles and voids, respectively. Image filtering and segmentation were optimized to ensure that the boundaries of the voids and undispersed particles were well defined by visual comparisons between the segmented images and the original images. The size distributions of the undispersed particles were then analyzed from their respective binary images. The size of undispersed particles was determined using area equivalent diameter of the corresponding object in the binary image, where the area equivalent diameter is: Area Equivalent Diameter=$(4*Area\ of\ Dark\ objects/\pi)^{1/2}$. As used herein the term "particles" represents carbon black agglomerate particles, and not individual primary particles of carbon black. The area percentages of undispersed carbon black particles larger than 10 μm (the value "V") are shown in Table 7.

TABLE 7

Tire Tread Compound Filler Dispersion Characteristics

| Comparative & Experimental Tire Treads | Carbon Black phr | Silica Phr | % Area Undispersed Carbon Black Particles > 10 μm (V) |
|---|---|---|---|
| C1 (Examples 1-3) | 50 | 0 | 0.006 |
| E1 (Examples 1-3) | 50 | 0 | 0.035 |
| E3 (Example 5) | 40 | 10 | 0.046 |
| Commercial Truck Tire Tread (phr NR/BR/SBR) | | | |
| 66-1 40/30/30 | 48 | 0 | 1.05 |
| 66-2 80/20/0 | 46 | 3 | 0.93 |
| 66-3 100/0/0 | 50 | 2 | 0.19 |
| 66-4 80/20/0 | 40 | 8 | 0.28 |

In viewing macrodispersion characteristics, sample C1, the comparative liquid masterbatch sample, has better macrodispersion, as indicated by low numbers of undispersed large particles, relative to the sample E1 of the invention. Tire tread of the invention had more undispersed large filler particles than the C1 liquid masterbatch sample, but better dispersion and fewer undispersed large filler particles than all of the commercial tread comparative samples. Despite demonstrating slightly less beneficial macrodispersion characteristics relative to sample C1, made by a process known to deliver superior carbon black macrodispersion and attendant superior rubber material properties for tire treads, sample E1 of the invention unexpectedly showed comparable rubber properties to those of sample C1, as indicated by data set forth in Table 6.

Consistent with the superior macrodispersion characteristics of sample E1 of the invention relative to those of comparable commercial tire treads, rubber material properties of sample E1 are superior to those of comparative commercial tread compounds.

Example 5

Tread Compound with Blends of Elastomers and Fillers
Wet-Mixed Composite Preparation In this example a blend of two elastomers (RSS1 natural rubber, obtained from RCMA Group, Singapore, and Buna® CB 22 butadiene rubber, obtained from Lanxess, Germany in a NR/BR ratio of 80/20 phr) and two fillers (PROPEL® X25 carbon black obtained from Cabot Corporation and ZEOSIL® Z1165 MP precipitated silica obtained from Solvay USA Inc., Cranbury, NJ) were used to prepare sample E3, a wet-mixed composite. Two wet-mixed composites (Part A and Part B) were prepared to make the E3 sample compound. Never-dried carbon black pellets with a water content of 55-58%, by weight of total wet carbon black were mixed with the natural rubber to make Part A formulation set forth in Table 8A. To make the Part B formulation set forth in Table 8A, the Z1165 MP silica (at 5-7% moisture) was placed in a 5 gallon container and water (reverse osmosis treated) was slowly added while mixing at variable speeds with a Warner Paint Stirrer mounted to an Ika Laboratory Mixer until water and silica were homogenized to form a wet paste. The container of wet silica was sealed for 24 hours prior to adding to other components of Part B, including Silane (Si69) coupler, during preparation of the Part B wet-mixed composite.

TABLE 8A

Wet-Mixed Composite Formulations for Part A and Part B

| Component (phr)[a] | Part A | Part B |
|---|---|---|
| NR (RSS1) | 100.0 | 66.7 |
| BR (CB22) | | 33.3 |
| Wet PROPEL ®X25 CB Pellets | 50.0 | 33.4 |
| Wetted Z1165MP Silica | | 16.7 |
| Silane (Si69) | | 1.7 |
| 6PPD | 1.5 | 1.5 |

[a]Filler content is on a dry weight basis.

A BR-1600 Banbury® laboratory mixer ("BR1600" mixer; Farrel Corporation, Ansonia, CT) was used to make the wet-mixed composites Part A and B. The BR1600 mixer was operated with two 2-wing, tangential rotors (2WL), providing a capacity of 1.6 L. The process used for preparing the two wet-mixed composites is shown in Table 8B.

TABLE 8B

Process for Preparing Wet-mixed Composites

| Description | Part A and B |
|---|---|
| Mixer size | 1.6 L |
| Fill factor % | 70 |
| TCU ° C. | 85 |
| Rotor Speed rpm | 105 |
| Ram Pressure bar | 2.8 |

TABLE 8B-continued

Process for Preparing Wet-mixed Composites

| Description | Part A and B |
|---|---|
| Time (s) | |
| Add Composite/Elastomer | 0 s |
| Add ¾ CB, Silica, Silane | 30 s |
| Sweep, Add ¼ CB, Silica | 150 s |
| Sweep | 180 s |
| Add 6PPD | 140° C. |
| Sweep | 145° C. |
| Dump (temperature) | 160° C. |

Compound Preparation

The formulation used in the E3 sample compound is set forth in Table 9. Components used include antioxidants 6PPD [N-(1,3-dimethylbutyl)-N'-phenyl-p-phenylenediamine] (also used in Part A and Part B) and TMQ, standard rubber grades of zinc oxide, stearic acid, wax beads, sulfur and TBBS accelerator, all obtained from Akrochem, Akron, Ohio. The solid dry natural rubber had a moisture content of <1 wt %.

An intermeshing mixer (Carter 55 L Intermeshing Mixer with Interswirl Rotors, Carter, Manchester, UK) was used for mixing the E3 sample compound. The compounding processes were performed as described in Table 10.

Tires with tread containing E3 sample compound were prepared as described in Examples 1-3.

TABLE 9

Compound Formulation for Tire Tread

| Component | Sample E3 phr |
|---|---|
| Filler: Carbon Black/Silica | 40/10 |
| NR (RSS1)/BR (CB22) Rubber Blend | 80/20 |
| Wet- Mixed Composite Part A | 60.5 |
| Wet-Mixed Composite Part B | 92.0 |
| 6PPD | 0.5 |
| TMQ | 1.5 |
| Zinc Oxide | 3.0 |
| Stearic Acid | 2.0 |
| Wax beads | 1.5 |
| TBBS | 1.5 |
| Sulfur | 1.3 |

TABLE 10

Stages 1-3 Mixing of Sample E3 Compound

| Description Mixing Stage: | Stage 1 | Stage 2 | Stage 3 |
|---|---|---|---|
| Mixer size 55 L | | | |
| Fill factor % | 70 | 70 | 68 |
| TCU ° C. | 40 | 40 | 30 |
| Rotor Speed rpm | 30 | 30 | 25 |
| Ram Pressure bar | 5.5 | 5.5 | 3.4 |
| Time (s) | | | |
| Add Composites | 0 s | 0 s | 0 s |
| Add Smalls | 30 | | |
| Add Curatives | | | 0 s |
| Sweep | 90 s | | 45 s |
| Dump (temperature) | 180 s (not exceed | 180 s (not exceed | 90 s (not exceed |

TABLE 10-continued

Stages 1-3 Mixing of Sample E3 Compound

| Description Mixing Stage: | Stage 1 | Stage 2 | Stage 3 |
|---|---|---|---|
| | 140° C.) | 140° C.) | 110° C.) |
| Final Mooney Viscosity ML (1 + 4) at 100° C., MU | — | — | 83 |

TABLE 11

Tire Tread Properties - E3 Sample

| | NR/SBR/BR phr | Carbon Black phr | Silica phr | Tangent Delta @60 C. | Elongation @ Break, RT | M300/ M100, RT |
|---|---|---|---|---|---|---|
| Experimental Tire Tread | | | | | | |
| E3 | 80/0/20 | 40 | 10 | 0.10 | 430 | 5.43 |
| Commercial Tire Tread | | | | | | |
| 33 | 70/30/0 | 42 | 14 | 0.07 | 400 | 4.82 |
| 34 | 80/20/0 | 44 | 9 | 0.08 | 450 | 4.48 |
| 35 | 60/40/0 | 46 | 12 | 0.07 | 390 | 5.03 |
| 36 | 80/0/20 | 43 | 9 | 0.06 | 420 | 4.87 |
| 37 | 70/0/30 | 51 | 9 | 0.08 | 390 | 5.05 |
| 38 | 60/0/40 | 56 | 13 | 0.12 | 340 | 3.68 |
| 39 | 70/0/30 | 52 | 9 | 0.12 | 390 | 8.08 |
| 40 | 80/0/20 | 55 | 8 | 0.10 | 350 | 4.37 |
| 41 | 70/0/30 | 48 | 7 | 0.06 | 365 | 4.32 |
| 42 | 80/0/20 | 42 | 5 | 0.07 | 380 | 5.17 |
| 43 | 70/0/30 | 39 | 7 | 0.06 | 360 | 5.06 |
| 44 | 70/0/30 | 51 | 9 | 0.07 | 410 | 5.02 |
| 45 | 60/0/40 | 55 | 8 | 0.12 | 450 | 4.82 |

As may be observed from macrodispersion data in Table 7 for the E3 sample tread of the invention, relative to comparable commercial tire treads, the tire tread of the invention comprising a blend of elastomers and silica as well as carbon black filler exhibits higher quality filler dispersion, demonstrating unique product characteristics. Data set forth in Table 11 show the rubber properties of such tire treads comprising a blend of elastomers and a blend of carbon black and silica filler were superior to those of a range of 13 comparable commercial truck tire treads.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A tire tread comprising at least one elastomer and 40-80 phr of at least one filler, the filler comprising at least 40 phr of at least one carbon black, the tire tread having:
   a. Modulus ratio >5.60;
   b. Percent elongation at break >470, and
   c. Tan delta at 60° C. ≥0.10 and <0.25,
wherein said tire tread is characterized by a macrodispersion value V, an area percentage of undispersed carbon black particles larger than 10 um determined by optical microscopy in transmission mode, according to the equation: 0.01<V<0.15.

2. The tire tread of claim 1, wherein said modulus ratio, said percent elongation at break, and said tan delta values are based on said tire tread being tested with said carbon black at 50 phr.

3. The tire tread of claim 1, wherein the elastomer comprises a blend of elastomers selected from natural rubber, functionalized natural rubber, styrene-butadiene rubber, functionalized styrene-butadiene rubber, polybutadiene rubber, functionalized polybutadiene rubber, and blends thereof.

4. A tire tread comprising at least one elastomer and 20-80 phr of at least one filler, the filler comprising 40 phr or less of at least one carbon black, the tread having:
   a) Modulus ratio ≥5.43;
   b) Percent elongation at break >400, and
   c) Tan delta at 60° C. >0.09 and <0.15,
wherein said tire tread is characterized by a macrodispersion value V, an area percentage of undispersed carbon black particles larger than 10 um determined by optical microscopy in transmission mode, according to the equation: 0.01<V<0.15.

5. A tire tread comprising at least one elastomer and 20-80 phr of at least one filler, the filler comprising 40 phr or less of at least one carbon black, and the tread characterized by a macrodispersion value V, an area percentage of undispersed carbon black particles larger than 10 μm determined by optical microscopy in transmission mode, of greater than 0.01, and the tread having at least one of:
   a) Modulus ratio ≥5.43; or
   b) Percent elongation at break >400, or
   c) Tan delta at 60° C. <0.25.

6. The tire tread of claim 1, wherein the filler comprises at least one material selected from carbonaceous materials, carbon black, silica, nanocellulose, lignin, clays, nanoclays, metal oxides, metal carbonates, pyrolysis carbon, graphenes, graphene oxides, reduced graphene oxide, carbon nanotubes, single-wall carbon nanotubes, multi-wall carbon nanotubes, or combinations thereof, and coated and treated materials thereof.

7. The tire tread of claim 1, wherein the filler comprises at least one material selected from carbon black, silica, and coated and treated materials thereof.

8. The tire tread of claim 1, wherein the elastomer is selected from natural rubber, functionalized natural rubber, styrene-butadiene rubber, functionalized styrene-butadiene rubber, polybutadiene rubber, functionalized polybutadiene rubber, polyisoprene rubber, ethylene-propylene rubber, isobutylene-based elastomers, polychloroprene rubber, nitrile rubber, hydrogenated nitrile rubber, polysulfide rubber, poleyacrylate elastomers, fluoroelastomers, perfluoroelastomers, silicone elastomers, and blends thereof.

9. The tire tread of claim 1, wherein the elastomer is styrene-butadiene rubber, functionalized styrene-butadiene rubber, polybutadiene rubber, polyisoprene rubber, ethylene-propylene rubber, nitrile rubber, hydrogenated nitrile rubber, or blends thereof.

10. The tire tread of claim 1, wherein the elastomer is natural rubber or functionalized natural rubber or both.

11. The tire tread of claim 10, wherein the filler is selected from carbon black, silica, and coated and treated materials thereof.

12. A tire tread comprising at least one elastomer and 20-80 phr of at least one filler, the filler comprising at least 40 phr of at least one carbon black, the tire tread having:
   a) Modulus ratio >5.60;
   b) Percent elongation at break >480, and optionally,
   c) Tan delta at 60° C. <0.25,
and the tread is characterized by a macrodispersion value V, an area percentage of undispersed carbon black particles larger than 10 µm as determined by optical microscopy in transmission mode, of greater than 0.01.

* * * * *